US007536938B2

(12) United States Patent
Kim

(10) Patent No.: US 7,536,938 B2
(45) Date of Patent: May 26, 2009

(54) APPARATUS FOR CUTTING SERIES OF MEDICINE PACKETS

(75) Inventor: Jun-ho Kim, Dalseo-Gu (KR)

(73) Assignee: JVM Co., Ltd., Dalseo-Gu (KR)

( * ) Notice: Subject to any disclaimer, the term of this patent is extended or adjusted under 35 U.S.C. 154(b) by 0 days.

(21) Appl. No.: 12/048,275

(22) Filed: Mar. 14, 2008

(65) Prior Publication Data

US 2008/0156159 A1 Jul. 3, 2008

Related U.S. Application Data

(62) Division of application No. 11/202,181, filed on Aug. 12, 2005, now abandoned.

(30) Foreign Application Priority Data

May 25, 2005 (KR) ...................... 10-2005-0044070
May 25, 2005 (KR) ...................... 10-2005-0044072

(51) Int. Cl.
*B23Q 15/00* (2006.01)

(52) U.S. Cl. ................................ 83/74; 83/209; 83/367

(58) Field of Classification Search ..................... 83/74, 83/76, 209, 367, 403.1, 240, 241, 263, 264, 83/370, 371
See application file for complete search history.

(56) References Cited

U.S. PATENT DOCUMENTS 3,101,638 A 8/1963 Richard et al.
3,519,510 A 7/1970 Ardolino et al.
4,033,492 A * 7/1977 Imai ............................ 226/25
4,207,667 A 6/1980 Angelo et al.
4,543,863 A * 10/1985 Rader ............................ 83/76
4,566,359 A 1/1986 Miyagi et al.
4,737,904 A * 4/1988 Ominato ...................... 83/209
4,949,607 A * 8/1990 Yuito .......................... 83/367
4,955,265 A * 9/1990 Nakagawa et al. ............. 83/74
5,062,340 A 11/1991 Greven
5,241,884 A * 9/1993 Smithe et al. .................. 83/76
5,472,127 A * 12/1995 Ichii et al. ..................... 226/44
5,630,347 A 5/1997 Elvio
5,777,879 A 7/1998 Sommerfeidt
2008/0156159 A1 7/2008 Kim

OTHER PUBLICATIONS

U.S. Appl. No. 12/118,827, filed May 12, 2008, Kim.

* cited by examiner

*Primary Examiner*—Stephen Choi
(74) *Attorney, Agent, or Firm*—Oblon, Spivak, McClelland, Maier & Neustadt, P.C.

(57) ABSTRACT

An apparatus for cutting a series of medicine packets discharged from an automatic medicine packaging machine into individual doses to automatically load the cut medicine packets on a loading device is disclosed. The apparatus includes a feeding device for feeding the series of medicine packets from the upper side of a main body to a stepped part at the other side of the main body, a cutting device for cutting the series of medicine packets by one medicine packet at the stepped part, a loading device for loading the medicine packets, cut by the cutting device and dropped to the stepped part, by a predetermined number, and a controller including a position sensor for detecting a position of the hole in the medicine packet and controlling the feeding device and the cutting device based on the position information of the hole of the medicine packets inputted from the position sensor.

1 Claim, 26 Drawing Sheets

APPARATUS FOR CUTTING SERIES OF MEDICINE PACKETS

CROSS-REFERENCE TO RELATED APPLICATION

This patent application is a divisional of U.S. application Ser. No. 11/202,181, filed Aug. 12, 2005, which is based on Korean Patent Application Nos. 10-2005-0044070 filed May 25, 2005 and 10-2005-0044072 filed on May 25, 2005 in the Korean Intellectual Property Office. U.S. patent application Ser. No. 11/202,181 is incorporated herein by reference.

BACKGROUND OF THE INVENTION

1. Field of the Invention

The present invention relates to an apparatus for cutting a series of medicine packets discharged from an automatic medicine packaging machine into individual doses to automatically load the cut medicine packets on a loading device.

2. Description of the Related Art

Generally, an automatic medicine packaging machine indicates an apparatus for automatically packaging medicines into individual doses.

The structure and operation of a conventional automatic medicine packaging machine will be described with reference to FIG. 24 schematically depicting the conventional automatic medicine packaging machine packager.

As shown in FIG. 24, the conventional automatic medicine packaging machine includes a plurality of tablet cassettes 2 installed on a shelf disposed at the upper side of a main body 1, a hopper 3 installed at the lower side of the tablet cassettes 2, a pair of packaging sheet rolls disposed at the lower lateral sides of the hopper 3, a printer 5 installed at the lower side of one of the packaging rolls 4 to print information such as the patient name, how to take the medicine, or the like, a pair of driving rollers installed below the hopper 3, a sealer 7 disposed between the hopper 3 and the driving rollers 6 to weld the packaging sheets to form a series of medicine packets R, and a punch 8 disposed below the sealer 7 to form holes in the series of medicine packets R.

In such the conventional automatic medicine packaging apparatus, tablets, dropped into the hopper 3 from the tablet cassettes 2, are inserted between a pair of packaging sheets drawn from the packaging rolls 4 by the driving rollers 6, and the sealer 7 welds the packaging sheets traveling downward to finish a series of medicine packets R, then the series of medicine packets is discharged out through the lateral side of the main body 1.

The discharged series of medicine packets R has a series of medicine packets having a plurality of holes punched by the punch 8, and is separated into individual packets by a worker to store bundles of medicine packets on a pin.

In addition, operations of various devices installed in the main body 1 are controlled by a controller 1*a*.

FIGS. 25 and 26 are photographs of the upper and lower sides of a series of medicine packets.

As shown in the photographs, in a series of medicine packets discharged to a side of the conventional automatic medicine packaging machine, a plurality of medicine packets is formed in series by welding a transparent packaging sheet and an opaque packaging sheet so that tablets accommodated in the medicine packets can be seen through the transparent packaging sheets forming the upper sides of the medicine packets.

On the lower sides of the medicine packets, barcodes are printed. The barcodes allow a user to know information about the tablets accommodated in the medicine packets through an external device such as a barcode reader.

There are two types of the medicine packets, namely, one has an inserting hole formed in the upper side by a punch, and the other has no the insert hole.

However, since the series of medicine packets R, discharged from the conventional automatic medicine packaging apparatus is cut by a worker to make a bundle of medicine packets using a pin in order to easily store the bundle of medicine packets, a great deal of manpower and time for cutting and storing the series of medicine packets R are required.

Moreover, when there is a medicine packet in the series of medicine packets in which the barcode is misprinted in the upper sides thereof or which contains a damaged tablet, it is hard for a worker to remove the defective medicine packet, and a great deal of manpower and time for selecting and removing the defective medicine packet are required.

SUMMARY OF THE INVENTION

Therefore, the present invention has been made in view of the above and/or other problems, and it is an object of the present invention to provide an apparatus for automatically cutting a series of medicine packets by one medicine packet to automatically load the cut medicine packet on a loading device.

It is a further object of the present invention to provide an apparatus for cutting a series of medicine packets in which a series of medicine packets is smoothly fed into a feeding device.

It is another object of the present invention to provide an apparatus for cutting a series of medicine packets in which a series of medicine packets is precisely fed and conveyed by a simple structure.

It is yet another object of the present invention to provide an apparatus for cutting a series of medicine packets in which a medicine packet in a series of medicine packets is cut and is pressed.

It is yet another object of the present invention to provide an apparatus for cutting a series of medicine packets in which plural bundles consisting of a predetermined number of medicine packets are loaded.

It is yet another object of the present invention to provide an apparatus for cutting a series of medicine packets in which cutting of a series of medicine packets is conveniently adjusted according to the length of a series of medicine packets discharged from an automatic medicine packaging machine.

It is yet another object of the present invention to provide an apparatus for cutting a series of medicine packets in which a series of medicine packets discharged from an automatic medicine packaging machine is cut into individual medicine packets to automatically load on a loading device, and it is convenient to inspect whether a tablet in the medicine packet is damaged and a barcode is properly printed in the upper side of the medicine packet or not.

It is yet another object of the present invention to provide an apparatus for cutting a series of medicine packets in which it is convenient to inspect whether a barcode is properly printed in the upper side of the medicine packet and a tablet in the medicine packet is damaged or not by a simple structure.

It is yet another object of the present invention to provide an apparatus for cutting a series of medicine packets in which defective medicine packets are easily collected while normal medicine packets are easily loaded in a predetermined number.

It is yet another object of the present invention to provide an apparatus for inspecting and cutting a series of medicine packets in which visual inspection and cutting of the medicine packets discharged from an automatic medicine packaging machine are easily performed.

In accordance with the present invention, the above and other objects can be accomplished by the provision of an apparatus for cutting a series of medicine packets including: a feeding device for feeding the series of medicine packets, in which the medicine packets having holes are continuously connected to each other, from the upper side of a main body to a stepped part formed at the other side of the main body; a cutting device for cutting the series of medicine packets fed along the upper side of the main body by one medicine packet at the stepped part; a loading device for loading the medicine packets, cut by the cutting device and dropped to the stepped part, in predetermined number; and a controller including a position sensor for detecting a position of the hole formed in the medicine packet fed along the upper side of the main body and controlling the feeding device and the cutting device based on the position information of the hole of the medicine packets inputted from the position sensor.

Preferably, the apparatus for cutting a series of medicine packets further includes a winding roll, disposed at a side of the main body 10 at the leading end of the feeding device, around which the series of medicine packets is wound.

The feeding device includes a pair of feeding rollers driven by a motor and disposed at the upper side of the main body to bite and feed the upper and lower sides of the medicine packets into the feeding device, and a belt conveyor for conveying the medicine packets fed to the feeding device by the feeding rollers.

Moreover, the feeding device further includes a plurality of fixing pins for elastically pressing the upper sides of the medicine packets conveyed by the belt conveyor, and a pressing plate installed at the upper side of the main body to be elastically moved upward and downward by springs installed around the fixing pins.

Preferably, the cutting device includes a lower knife installed at the upper end of the main body, an upper knife corresponding to the lower knife and installed above the lower knife, a guide rod, in which the upper knife is installed to the upper end thereof, disposed in the main body to be slid upward and downward, and a vertical driving part installed in the main body to move the guide rod upward and downward under the control of the controller.

The apparatus for cutting a series of medicine further includes an elastically folded door installed in the stepped part near to the side of the lower knife such that the stepped part supports the medicine packets cut by the upper knife, a pusher is installed at the side of the upper knife and presses the medicine packet positioned at the upper side of the door downward, and a lower hole formed in the lower side of the pusher to press the periphery of the medicine packet.

Moreover, the loading device includes a loading pin installed in the stepped part and inserted into the holes formed in the medicine packets when the medicine packets cut by the cutting device are dropped, and a lower plate detachably coupled with the upper side of the stepped part and attached to the lower side of the loading pin to enable the loading pin to be detached from the stepped part.

Preferably, the loading device includes a plurality of loading pins respectively having lower plates coupled with the lower ends thereof, a sliding plate, installed to the upper side of the stepped part to slide in the horizontal direction, in which the plural lower plates are detachably coupled to the upper side, and a horizontal driving part for moving the sliding plate in the horizontal direction under the control of the controller.

Preferably, the loading device includes a plurality of loading pins respectively having lower plates installed to the lower sides thereof, a rotating plate, rotatably installed to the upper side of the stepped part, in which the plural loading plates are detachably installed along the circumference thereof, and a rotation driving part controlled by the controller to rotate the rotating plate.

Preferably, the loading device includes an open-topped loading case, detachably installed to the upper side of the stepped part, in which the cut medicine packets are dropped and loaded.

The apparatus for cutting a series of medicine packets further includes a length detecting device provided at the side of the main body to detect a length of the series of medicine packets discharged from the automatic medicine packaging machine and to input the detected length to the controller such that the feed of the series of medicine packets to the feeding device is adjusted.

Preferably, the length detecting device includes a weight rod for pressing the upper side of the series of medicine packets positioned between the automatic medicine packaging machine and the feeding device due to its weight, a link hinged with an end of the weight rod at an end and hinged with the main body at the other end, an angle sensor installed in the main body to detect an angle of the link and to input the detected angle to the controller, and a guide roller provided to a leading end of the main body to guide the series of medicine packets to the feeding device.

In accordance with the present invention, the above and other objects can be accomplished by the provision of an apparatus for cutting a series of medicine packets including: a feeding device for feeding the series of medicine packets, in which the medicine packets having holes are continuously connected to each other, from the upper side of a main body to a stepped part formed at the other side of the main body; an inspector for inspecting a barcode of the medicine packets fed by the feeding device and tablets in the medicine packets; a cutting device for cutting the series of medicine packets fed along the upper side of the main body into individual medicine packets at the stepped part; a rejecting and loading device for rejecting or loading the cut medicine packets based on the information received from the inspector; a controller including a position sensor for detecting a position of the hole formed in the medicine packet fed along the upper side of the main body and controlling the feeding device, the cutting device, and the rejecting and loading device based on the position information of the hole of the medicine packets inputted from the position sensor.

Preferably, the feeding device includes a guide roller disposed at the side of the main body, a pair of feeding rollers driven by a motor and disposed at the upper side of the main body to bite and feed the upper and lower sides of the medicine packets guided by the guide roller into the feeding device, and a belt conveyor for conveying the medicine packets fed by the feeding rollers.

Preferably, the feeding device further includes a plurality of fixing pins for elastically pressing the upper sides of the medicine packets conveyed by the belt conveyor, and a pressing plate installed at the upper side of the main body to be elastically moved upward and downward by springs installed around the fixing pins.

Preferably, the rejecting and loading device includes an elastically folded door installed in the stepped part near to the side of the lower knife such that the stepped part supports the medicine packets cut by the cutting device, a rejecting plate for rejecting the cut medicine packet positioned on the door and determined to be a defective medicine packet from a side to the other side of the stepped part, a rejecting plate driving part for driving the rejecting plate to reciprocally move in the horizontal direction, a pusher is installed above the door in the vertical direction to drop a normal medicine packet cut by the cutting device, and a pusher driving part for driving the pusher to reciprocally move in the vertical direction.

Preferably, the rejecting and loading device further includes an accumulating vessel disposed at the side of the stepped part to accumulate the defective medicine packet removed from the side by the rejecting plate, a loading pin installed in the stepped part and inserted into the holes formed in the medicine packets when the medicine packets are dropped by the pusher, and a lower plate detachably coupled with the upper side of the stepped part and detachably attached to the lower side of the loading pin.

In accordance with the present invention, the above and other objects can be accomplished by the provision of an apparatus for cutting a series of medicine packets including: a feeding device for feeding the series of medicine packets, in which the medicine packets having holes are continuously connected to each other, from the upper side of a main body to a stepped part formed at the other side of the main body; a visual inspector for inspecting whether the medicine packets are defective or normal with the naked eye and assigning the inspected medicine packets to defective medicine packet or normal medicine packets, and including a pair of cameras for capturing images of the upper and lower sides of the respective medicine packets fed by the feeding device, and a monitor for displaying the images of the upper and lower sides of the medicine packets captured by the cameras; a button manipulation part for assigning the medicine packets to be a defective medicine packet or a normal medicine packet; and a cutting device for cutting the medicine packets one by one from the series of medicine packets, which has been inspected by the visual inspector, fed to the stepped part at the side of the main body.

The apparatus further includes a defective medicine packet marker for marking medicine packets, assigned to a defective medicine packet by the visual inspector, marks indicating a defective medicine packet.

Preferably, the defective medicine packet marker includes a punch installed at a side of the visual inspector above the main body to slide up and down, and a punch driver for moving the punch in the vertical direction according to a defective medicine packet assigning signal inputted by the button manipulation part.

The apparatus further includes a rejecting and loading device for rejecting the defective medicine packets among the medicine packets cut by the cutting device and positioned at the stepped part to a side of the apparatus for cutting a series of medicine packets and for dropping the normal medicine packets and loading the dropped normal medicine packets by a predetermined number of the normal medicine packets, and a controller including a sensor for detecting through-hole formed in the medicine packets by the punch to determine whether the feeding medicine packets and insert holes formed in the medicine packets, and controlling the feeding device, the cutting device, and the rejecting and loading device according to the detected information inputted from the sensor.

The feeding device includes a guide roller disposed at the side of the main body, a pair of feeding rollers driven by a motor and disposed at the upper side of the main body to bite and feed the upper and lower sides of the medicine packets guided by the guide roller into the feeding device, and a pair of discharging rollers disposed at the other upper side of the main body, corresponding to the feeding rollers, and driven by a motor to bite and feed the upper and lower sides of the series of medicine packets to the stepped part.

The button manipulation part includes a defective medicine packet assigning button for assigning the medicine packets displayed on the monitor to the defective medicine packets, and a normal medicine packet assigning button for assigning the medicine packets displayed on the monitor to the normal medicine packets.

BRIEF DESCRIPTION OF THE DRAWINGS

These and/or other objects and advantages of the present invention will become apparent and more readily appreciated from the following description of the embodiments, taken in conjunction with the accompanying drawings, in which.

DESCRIPTION OF THE PREFERRED EMBODIMENTS

Hereinafter, an apparatus for cutting a series of medicine packets according to the preferred embodiments of the present invention will be described in detail with reference to the accompanying drawings.

Figure 1:
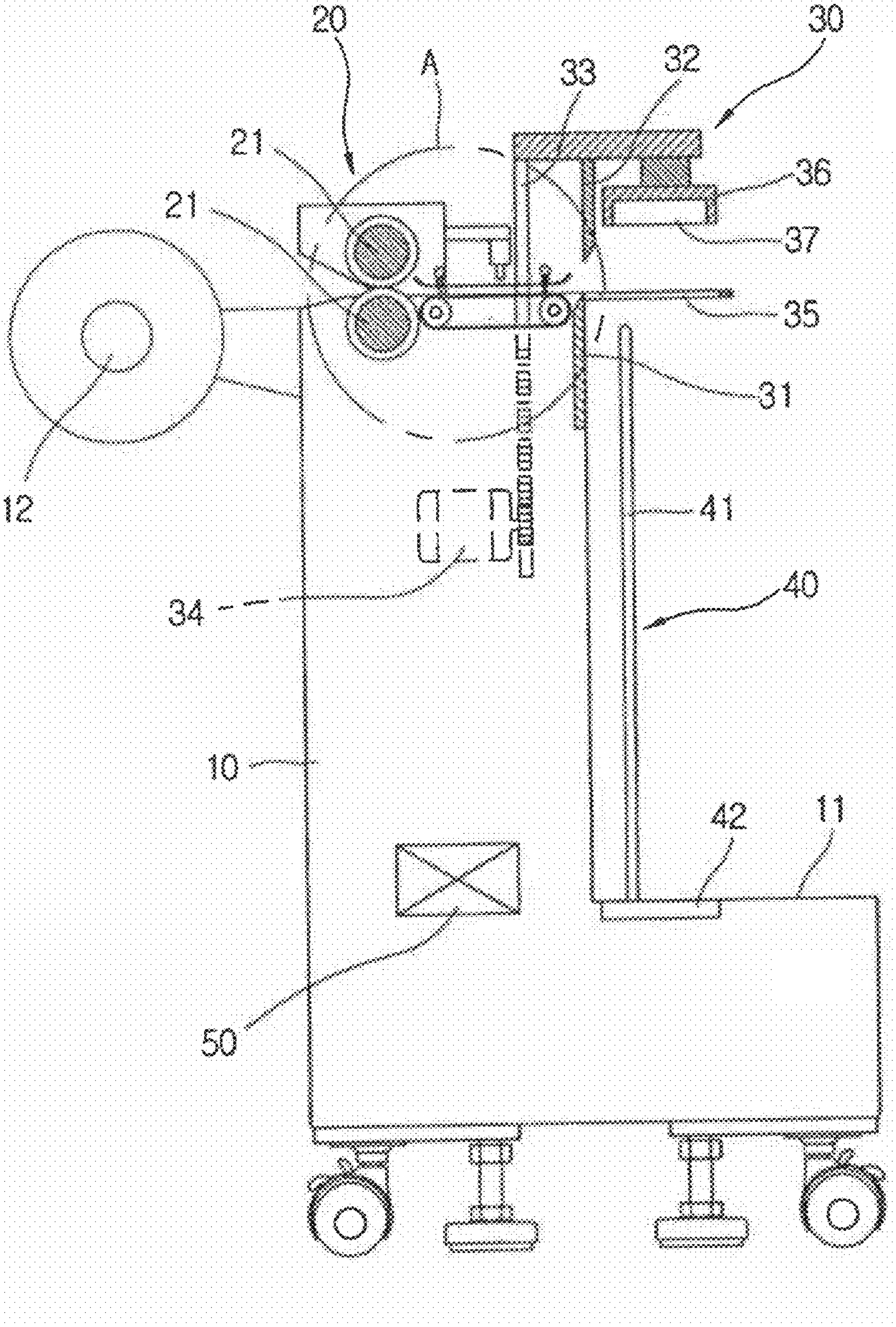
FIG. 1 is a schematic front sectional view illustrating an apparatus for cutting a series of medicine packets according to a first preferred embodiment of the present invention.
Figure 2:
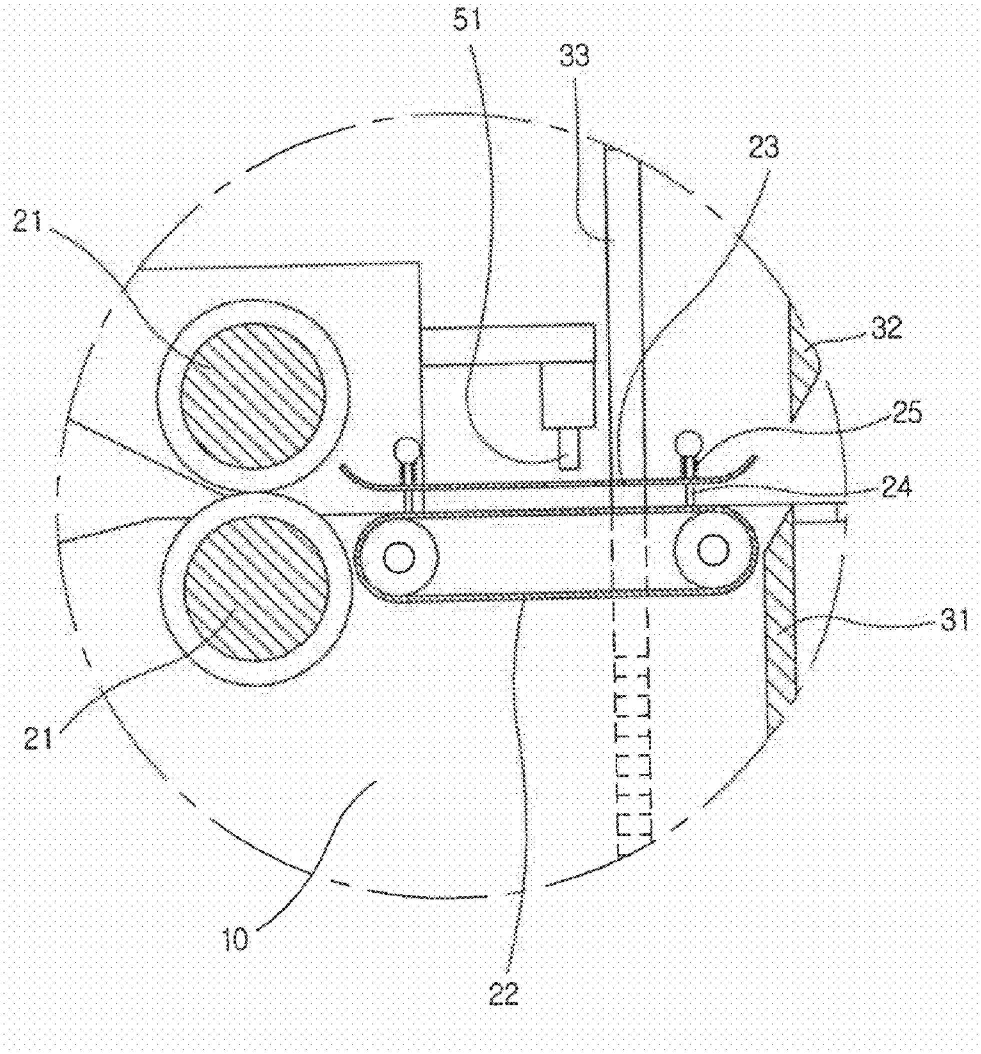
FIG. 2 is an enlarged view of the portion "A" in FIG. 1.
Figure 3:
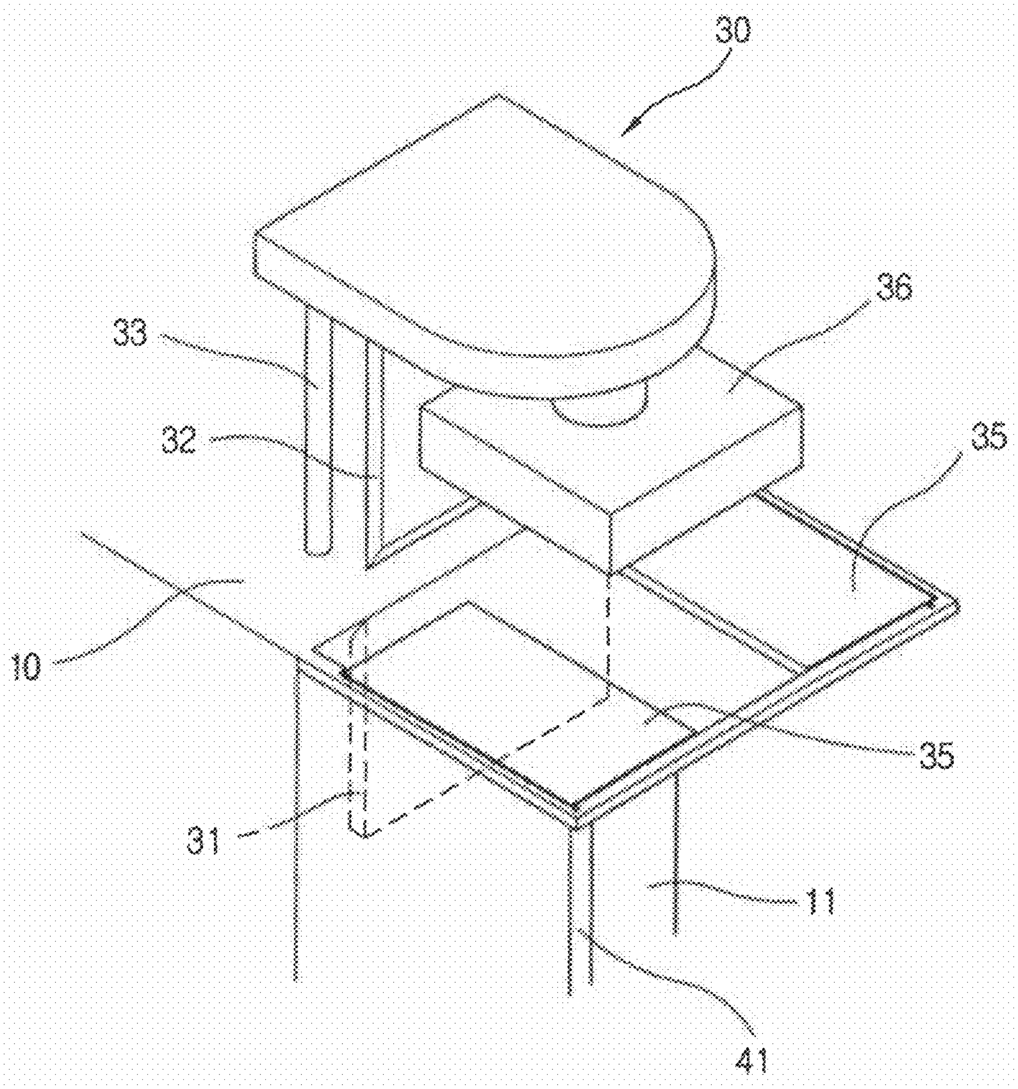
FIG. 3 is an enlarged perspective views illustrating main parts of the apparatus for cutting a series of medicine packets according to the first preferred embodiment of the present invention.

FIG. 1 is a schematic front sectional view illustrating an apparatus for cutting a series of medicine packets according to a first preferred embodiment of the present invention, FIG. 2 is an enlarged view of the portion "A" in FIG. 1; and FIG. 3 is an enlarged perspective view illustrating main parts of the apparatus for cutting a series of medicine packets according to the first preferred embodiment of the present invention.

As shown in the drawings, an apparatus for cutting a series of medicine packets according to the first preferred embodiment of the present invention includes a feeding device 20 for feeding a series of medicine packets from the upper side of a main body 10 to a stepped part 11 formed at the other side of the main body 10, a cutting device 30 for cutting the series of medicine packets into individual medicine packets at the stepped part 11, a loading device 40 for loading the medicine packets, cut by the cutting device 30 and dropped to the stepped part 11, in predetermined number, and a controller 50 for detecting holes formed in the medicine packets fed along the upper side of the main body 10 by a sensor 51 and controlling the feeding device 20 and the cutting device 30 based on the position information of the holes of the medicine packets inputted from the sensor 51.

The main body 10 includes a winding roll 12, disposed at a side of the main body 10, i.e. at the leading end of the feeding device 20 and around which the series of medicine packets are wound. Since a series of medicine packets, filled with medicine by an automatic medicine packaging machine and examined with the naked eye, are wound around the winding roll 12, a series of a great deal of medicine packets are easily cut by the apparatus for cutting a series of medicine packets.

Moreover, the feeding device 20 includes a pair of feeding rollers 21 driven by a motor and disposed at the upper side of the main body 10 to bite and feed the upper and lower sides of the medicine packets into the feeding device 20, a belt conveyor 22 for conveying the medicine packets fed to the feeding device 20 by the feeding rollers 21, a plurality of fixing pins 24 for elastically pressing the upper sides of the medicine packets conveyed by the belt conveyor 22, and a pressing plate 23 installed at the upper side of the main body 10 to be elastically moved upward and downward by springs installed around the fixing pins 24.

After a series of medicine packets wound around the winding roll 12 is fed into the main body 10 by the feeding rollers 21, the feeding device 20 allows the fed medicine packets to be precisely conveyed to the cutting device 30 by the belt conveyor 22 while being supported by the pressing plate 23.

Moreover, the cutting device 30 includes a lower knife 31 installed at the upper end of the main body 10, an upper knife 32 corresponding to the lower knife 31 and installed above the lower knife 31, a guide rod 33, in which the upper knife 32 is installed to the upper end thereof, disposed in the main body 10 to be slid upward and downward, and a vertical driving part 34 installed in the main body 10 to move the guide rod 33 upward and downward under the control of the controller 50.

When a cutting portion of the medicine packets is positioned at the upper end of the lower knife 31, the cutting device 30 cuts the medicine packets such that the vertical driving part 34 is driven by the controller 50 to move the guide rod 33 downward so that the upper knife 32, installed to the upper end of the guide rod 33, moves downward and passes through the lower knife 31.

The vertical driving part 34 is preferably structured such that a rack, installed at the lower side of the guide rod 33 in the longitudinal direction to move the guide rod 33 in the longitudinal direction, is engaged with a pinion driven by the motor and is moved in the longitudinal direction due to the rotation of the pinion by the motor. However, the structure of the vertical driving part 34 is not restricted to the above structure and various techniques can be applied to the vertical driving part 34.

In addition, an elastically folded door 35 is installed in the stepped part 11 near to the side of the lower knife 31 such that the stepped part 11 supports the medicine packets cut by the upper knife 32, and a pusher 36 is installed at the side of the upper knife 32 and presses the medicine packet positioned at the upper side of the door 35 downward. The pusher 36 has a lower hole 37 formed in the lower side thereof to press the periphery of the medicine packet.

The door 35 supports the cut medicine packets in a state capable of being discharged downward. The door 35 is pivoted and opened downward about a hinge by the pusher 36, and restored to its initial state, i.e. a horizontal state by a torsion spring when the pusher 36 is lifted.

The pusher 36 is installed to a side of the upper knife 32 and moves downward when the upper knife 32 moves down so as to press the medicine packet positioned on the upper side of the door 35 so that the medicine packets are precisely and accurately loaded on the loading device 40.

The lower hole 37 presses only the peripheral of the medicine packet thereby protecting the tablet accommodated in the medicine packet from damage when the lower side of the pusher 36 collides against the tablet.

Moreover, the loading device 40 includes a loading pin 41 installed in the stepped part 11 and inserted into the holes formed in the medicine packets when the medicine packets cut by the cutting device 30 are dropped, and a lower plate 42 detachably coupled with the upper side of the stepped part 11 and attached to the lower side of the loading pin 41 to enable the loading pin 41 to be detached from the stepped part 11.

The loading device 40 is structured such that a predetermined number of the cut medicine packets are hung and loaded on the loading pin 41 and the worker separates the lower plate 42 from the stepped part 11 and transports the loading pin 41 to a storage site.

In addition, the controller 50 precisely controls the feeding device 20 and the cutting device 30 based on the position information for the holes in the medicine packets inputted from the sensor 51 installed at the upper side of the main body 10.

The sensor 51 detects the positions of the holes formed in the medicine packets of a series of the medicine packets slid and conveyed along the lower side of the pressing plate 23 through a through-hole formed in the pressing plate 23.

Figure 4:
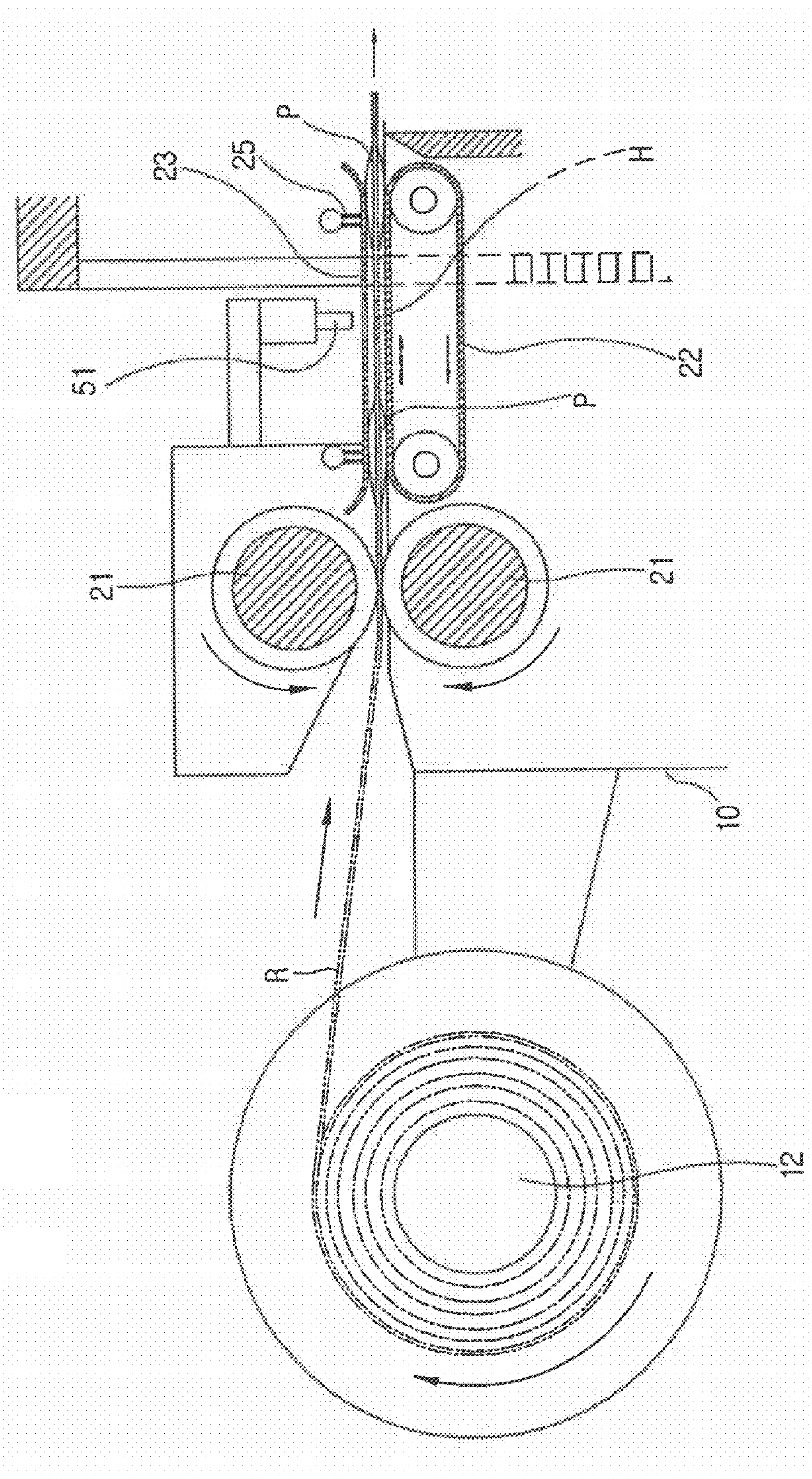
FIG. 4 is an enlarged front sectional view of main parts illustrating operation of a feeding device of the apparatus for cutting a series of medicine packets according to the first preferred embodiment of the present invention.

FIG. 4 is an enlarged front sectional view of main parts illustrating operation of the feeding device of the apparatus for cutting a series of medicine packets according to the first preferred embodiment of the present invention.

As shown in the drawing, the series of medicine packets R wound around the winding roll 12 disposed at the side of the main body 10 enters the upper other side of the main body 10 such that the lateral sides of the series of medicine packets are bitten by the feeding rollers 21.

The series of medicine packets R lifts the pressing plate 23, is supported by the pressing plate 23 and the springs 25 installed to the pressing plate 23, and is positioned on the belt conveyor 22. The series of medicine packets R positioned on the belt conveyor 22 is conveyed along the upper side of the main body 10 when the belt conveyor 22 is driven.

At that time, the sensor 51 installed at the upper side of the main body 10 detects the position information of the hole H, formed in the medicine packet P conveyed between the lower side of the pressing plate 23 and the upper side of the belt conveyor 22, through the through-hole formed in the pressing plate 23, and transmits the position information to the controller 50.

The controller 50, received the position information for the hole H of the medicine packet P, stops the belt conveyor 22 to interrupt the feed of the series of medicine packets R and initiates cutting of medicine packets P.

In other words, when the hole H of the medicine packet P is detected by the sensor 51, the controller 50 determines that the medicine packet P before the detected hole H reaches the cutting position, and stops the feed of the series of medicine packets R to cut the medicine packet P.

Figure 5:
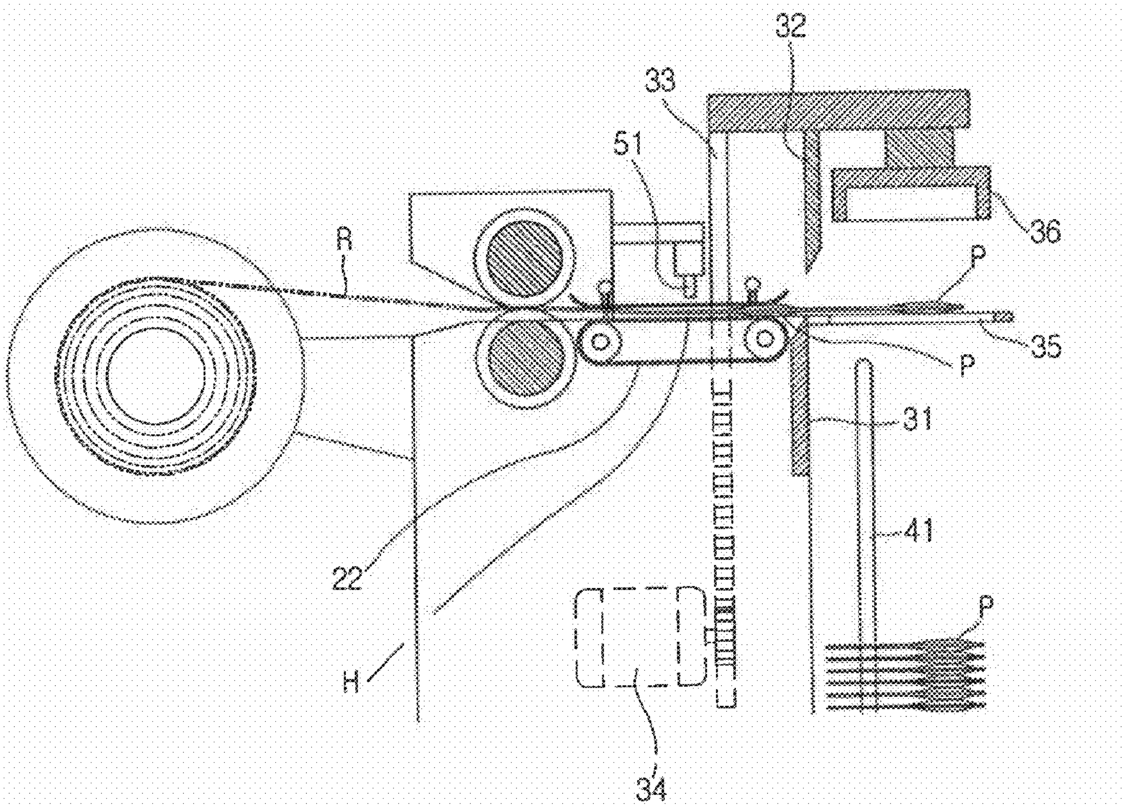
FIG. 5 is an enlarged front sectional view illustrating a state of main parts before cutting a medicine packet in the apparatus for cutting a series of medicine packets according to the first preferred embodiment of the present invention.
Figure 6:
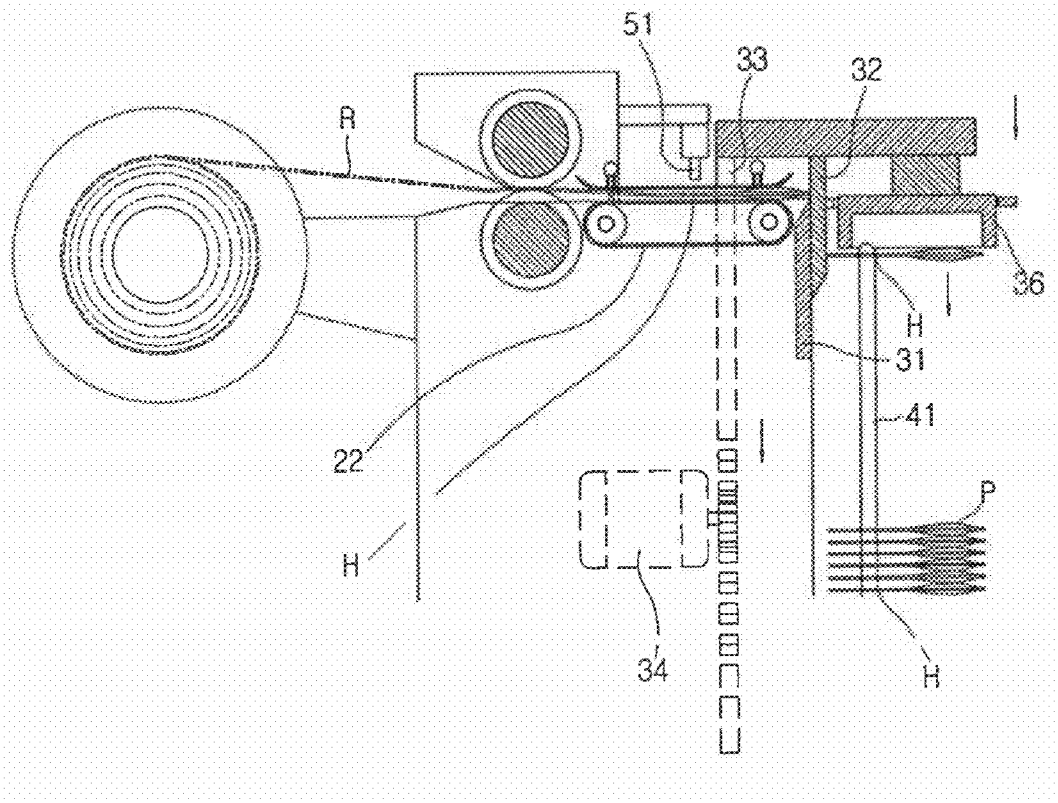
FIG. 6 is an enlarged front sectional view illustrating a state of main parts after cutting a medicine packet in the apparatus for cutting a series of medicine packets according to the first preferred embodiment of the present invention.

FIG. 5 is an enlarged front sectional view illustrating a state of main parts before cutting a medicine packet in the apparatus for cutting a series of medicine packets according to the first preferred embodiment of the present invention, and FIG. 6 is an enlarged front sectional view illustrating a state of main parts after cutting a medicine packet in the apparatus for cutting a series of medicine packets according to the first preferred embodiment of the present invention.

As shown in the drawings, when the position information for the hole H of the medicine packet P is inputted to the controller 50 by the sensor 51, the belt conveyor 22 is stopped and the feed of the series of the medicine packets R is also stopped.

At that time, the medicine packet P in front of the medicine packet P, the position of the hole H of which is detected by the sensor 51, passes through the belt conveyor 22 and is positioned on the door 35.

As such, when the belt conveyor 22 is stopped and the medicine packet P is positioned on the upper side of the door 35, the controller 34 drives the vertical driving part 34 to move the guide rod 33 downward so that the upper knife 32 coupled with the upper end of the guide rod 33 moves downward to the lower knife 31.

The cutting portion of the medicine packet P positioned on the door 35 is cut while the upper knife 32 passes through the lower knife 31, and the pusher 36 installed to the side of the upper knife 32 presses the periphery of the medicine packet P simultaneously with the downward movement of the upper knife 32.

As such, when the pusher 36 presses the cut medicine packet P, the door 35 is elastically opened and the hole H of the medicine packet P is precisely hung on the loading pin 41 and is loaded.

Figure 7:
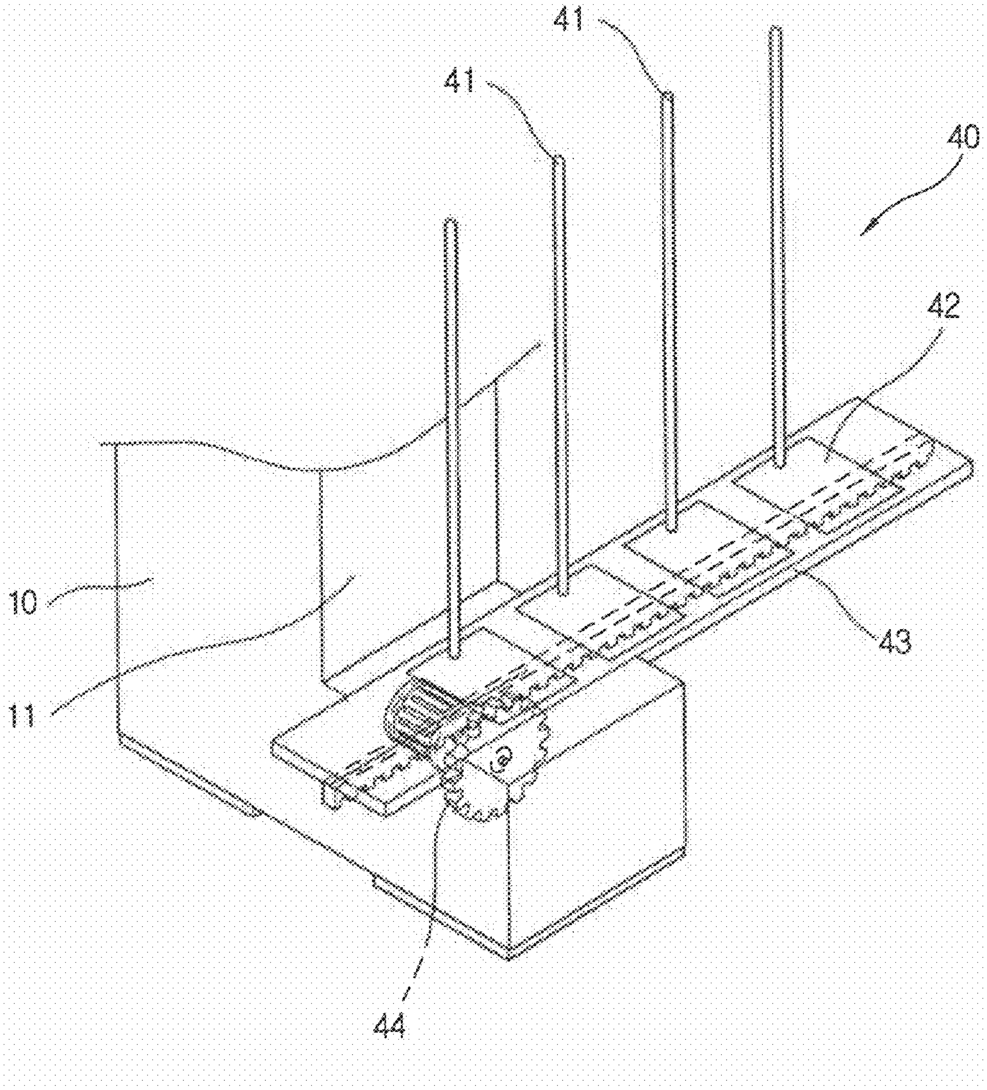
FIG. 7 is an enlarged perspective view illustrating main parts of an apparatus for cutting a series of medicine packets according to a second preferred embodiment of the present invention.

FIG. 7 is an enlarged perspective view illustrating main parts of an apparatus for cutting a series of medicine packets according to a second preferred embodiment of the present invention.

As shown in the drawing, the loading device 40, provided in the apparatus for cutting a series of medicine packets according to the second preferred embodiment of the present invention, includes a plurality of loading pins 41 respectively having lower plates 42 coupled with the lower ends thereof, a sliding plate 43, installed to the upper side of the stepped part 11 of the main body 10 to slide in the horizontal direction, in which the plural lower plates 42 are detachably coupled to the upper side, and a horizontal driving part 44 for moving the sliding plate 43 in the horizontal direction under the control of the controller 50.

When a predetermined number of medicine packets P are hung on a single loading pin 41, the loading device 40 drives the horizontal driving part 44 based the control of the controller 50 to slide the sliding plate 43 to a side thereof so that the medicine packets P are hung on another loading pin 41.

As such, the sliding plate 43 and the horizontal driving part 44 are driven to hang the medicine packets P on the plural loading pins 41 so that a great deal of the medicine packets P are automatically loaded.

The horizontal driving part 44 is implemented by a pinion a motor and a rack installed to the lower side of the sliding plate 43 and engaged with the pinion, but the present invention is not restricted to this configuration.

Figure 8:
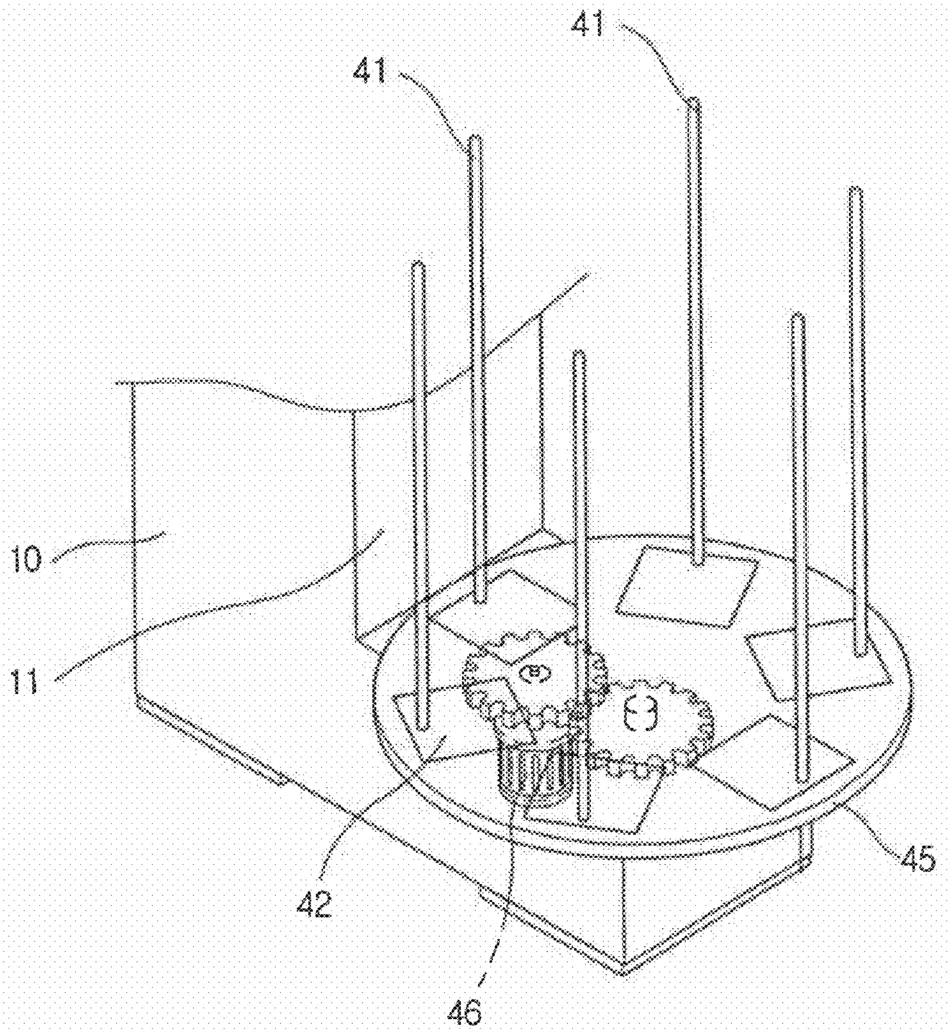
FIG. 8 is an enlarged perspective view illustrating main parts of an apparatus for cutting a series of medicine packets according to a third preferred embodiment of the present invention.

FIG. 8 is an enlarged perspective view illustrating main parts of an apparatus for cutting a series of medicine packets according to a third preferred embodiment of the present invention.

As shown in the drawing, a loading device 40, provided in the apparatus for cutting a series of medicine packets according to the third preferred embodiment of the present invention, includes a plurality of loading pins 41 respectively having lower plates 42 installed to the lower sides thereof, a rotating plate 45, rotatably installed to the upper side of the stepped part 11 of the main body 10, in which the plural loading plates 42 are detachably installed along the circumference thereof, and a rotation driving part 46 controlled by the controller 50 to rotate the rotating plate 45.

When a predetermined number of medicine packets P are hung on a single loading pin 41, the loading device 40 drives the rotation driving part 46 based the control of the controller 50 to rotate the rotating plate 45 to a side thereof so that the medicine packets P are hung on another loading pin 41.

As such, the rotating plate 45 and the rotation driving part 46 are driven to hang the medicine packets P on the plural loading pins 41 so that a great deal of the medicine packets P are automatically loaded.

The rotation driving part 46 is implemented by a driving gear driven by a motor and a rotating gear installed to the centerline of the rotating plate 45 and engaged with the driving gear, but the present invention is not restricted to this configuration.

Figure 9:
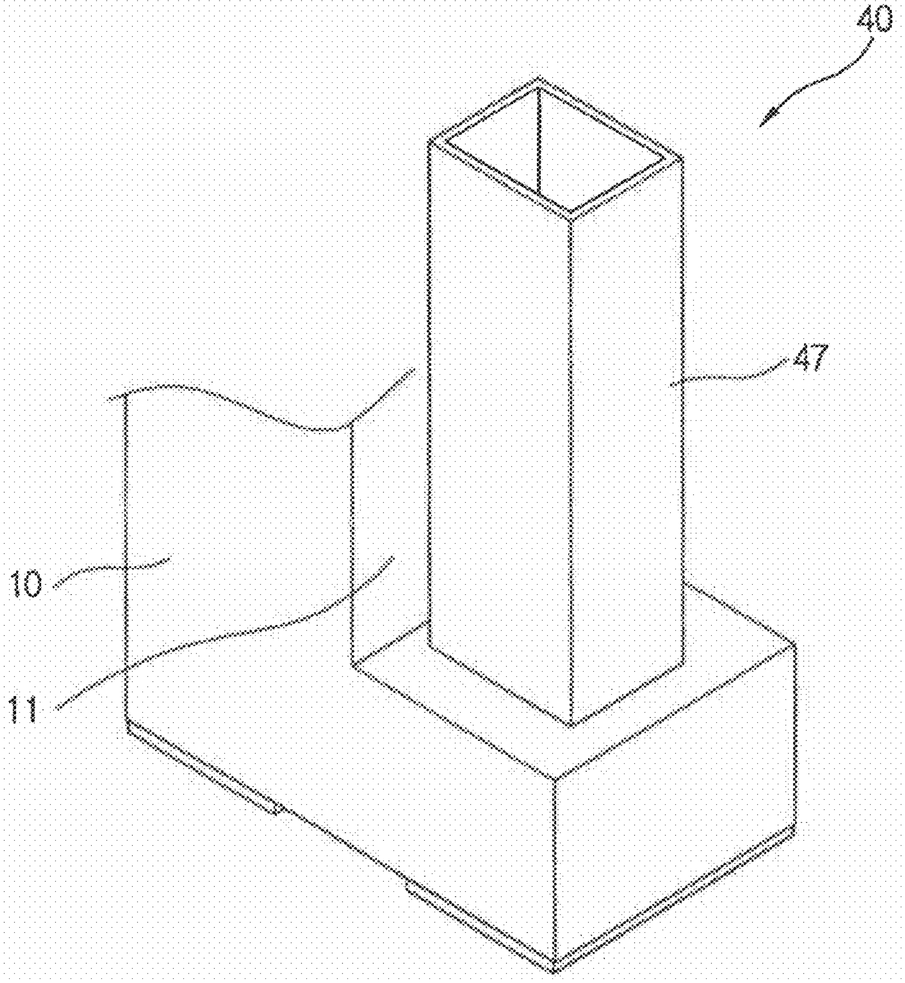
FIG. 9 is an enlarged perspective view illustrating main parts of an apparatus for cutting a series of medicine packets according to a fourth preferred embodiment of the present invention.

FIG. 9 is an enlarged perspective view illustrating main parts of an apparatus for cutting a series of medicine packets according to a fourth preferred embodiment of the present invention.

As shown in the drawing, a loading device 40, provided in the apparatus for cutting a series of medicine packets according to the fourth preferred embodiment of the present invention, includes an open-topped loading case 47, detachably installed to the upper side of the stepped part 11 of the main body 10, in which the cut medicine packets P are dropped and loaded.

The cut medicine packets P are dropped into and accumulated in the loading case 47 so that a great deal of medicine packets P is easily loaded.

Figure 10:
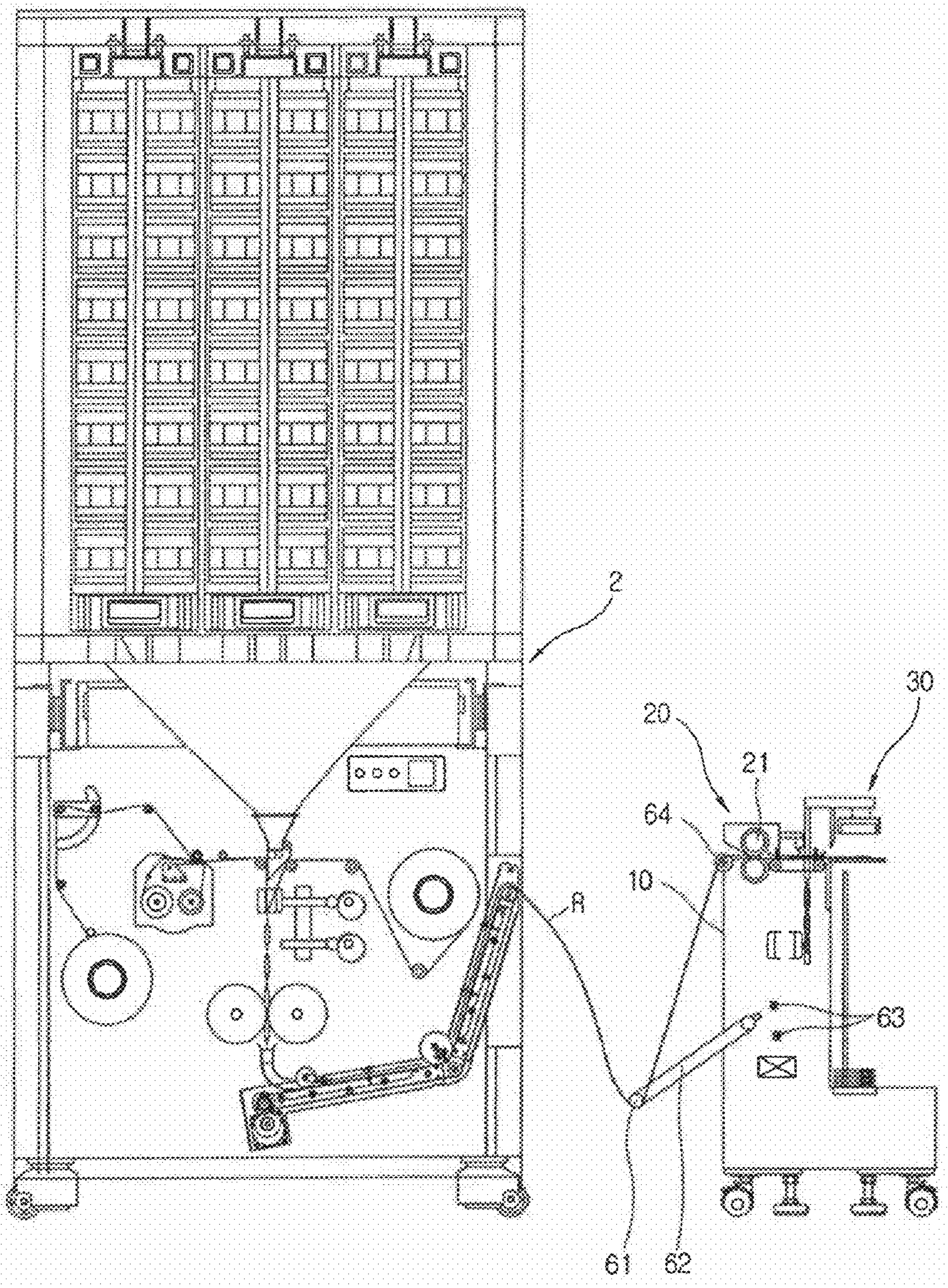
FIG. 10 is a front sectional view illustrating main parts of an apparatus for cutting a series of medicine packets according to a fifth preferred embodiment of the present invention.
Figure 11:
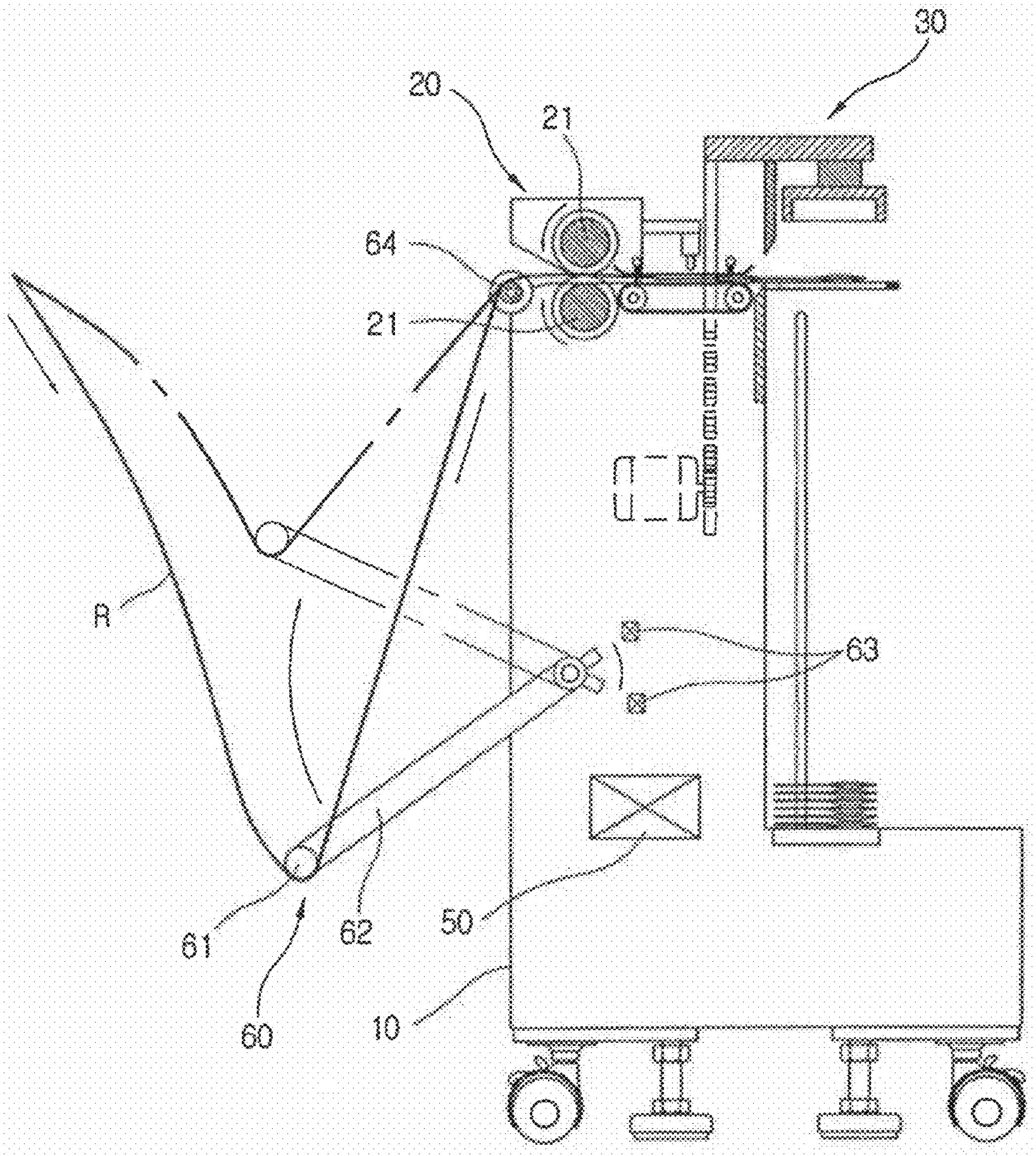
FIG. 11 is a front sectional view illustrating operational state of the apparatus for cutting a series of medicine packets according to the fifth preferred embodiment of the present invention shown in FIG. 10.

FIG. 10 is a front sectional view illustrating main parts of an apparatus for cutting a series of medicine packets according to a fifth preferred embodiment of the present invention, and FIG. 11 is a front section view illustrating operational state of the apparatus for cutting a series of medicine packets according to the fifth preferred embodiment of the present invention shown in FIG. 10.

As shown in the drawings, the apparatus for cutting a series of medicine packets according to the fifth preferred embodiment of the present invention further includes a length detecting device 60 provided at the side of the main body 10 to detect a length of the series of medicine packets R discharged from the automatic medicine packaging machine and to input the detected length to the controller 50 such that the feed of the series of medicine packets R to the feeding device 20 is adjusted.

The length detecting device 60 includes a weight rod 61 for pressing the upper side of the series of medicine packets R positioned between the automatic medicine packaging machine and the feeding device 20 due to its weight, a link 62 hinged with an end of the weight rod 61 at an end and hinged with the main body 10 at the other end, angle sensors 63 installed in the main body 10 to detect an angle of the link 62 and to input the detected angle to the controller 50, and a guide roller 64 provided to a leading end of the main body 10 to guide the series of medicine packets R to the feeding device 20.

The length detecting device 60 detects the length of the series of medicine packets R discharged from the automatic medicine packaging machine and inputs the detected length of the series of medicine packets R to the controller 50 so that the controller 50 can control the feeding device 20 and the cutting device 30 based on the detected length of the series of medicine packets R.

In other words, in a state of the apparatus for cutting a series of medicine packets according to the preferred embodiments of the present invention associated with the automatic medicine packaging machine, when the series of medicine packets R is discharged from the automatic medicine packaging machine 2, the weight rod 61, pressing the upper side of the series of medicine packets R, is pivoted downward together with the link 62 so that the series of medicine packets R is lengthened and the angle sensors 63 detect the pivoted angle of the link 62 and input the detected pivoted angle information to the controller 50.

The controller 50 determines that the series of medicine packets R is lengthened according to the detected pivoted angle information inputted from the angle sensor 63 and drives the feeding rollers 21 and the cutting device 30 to cut the series of medicine packets R as long as the increased length.

When the series of medicine packets R is guided by the guide roller 64 to be fed into the main body 10 via the feeding rollers 21 and the length thereof is shortened, the series of medicine packets R lifts the weight rod 61 so that the link 62 pivots upward.

When the angle sensor 63 detects the pivoted angle of the link 62 and inputs the detected angle information to the controller 50, the controller 50 drives the feeding device 20 based on the inputted angle information until the pivoted angle of the link 62 reaches a predetermined limit. When the pivoted angle of the link 62 reaches a predetermined limit, the controller 50 stops the feeding device 20 to prevent the series of medicine packets R from excessively feeding so that the feeding length of the series of medicine packets R is automatically adjusted such that the apparatus for cutting a series of medicine packets is easily associated with the automatic medicine packaging machine 2.

Figure 12:
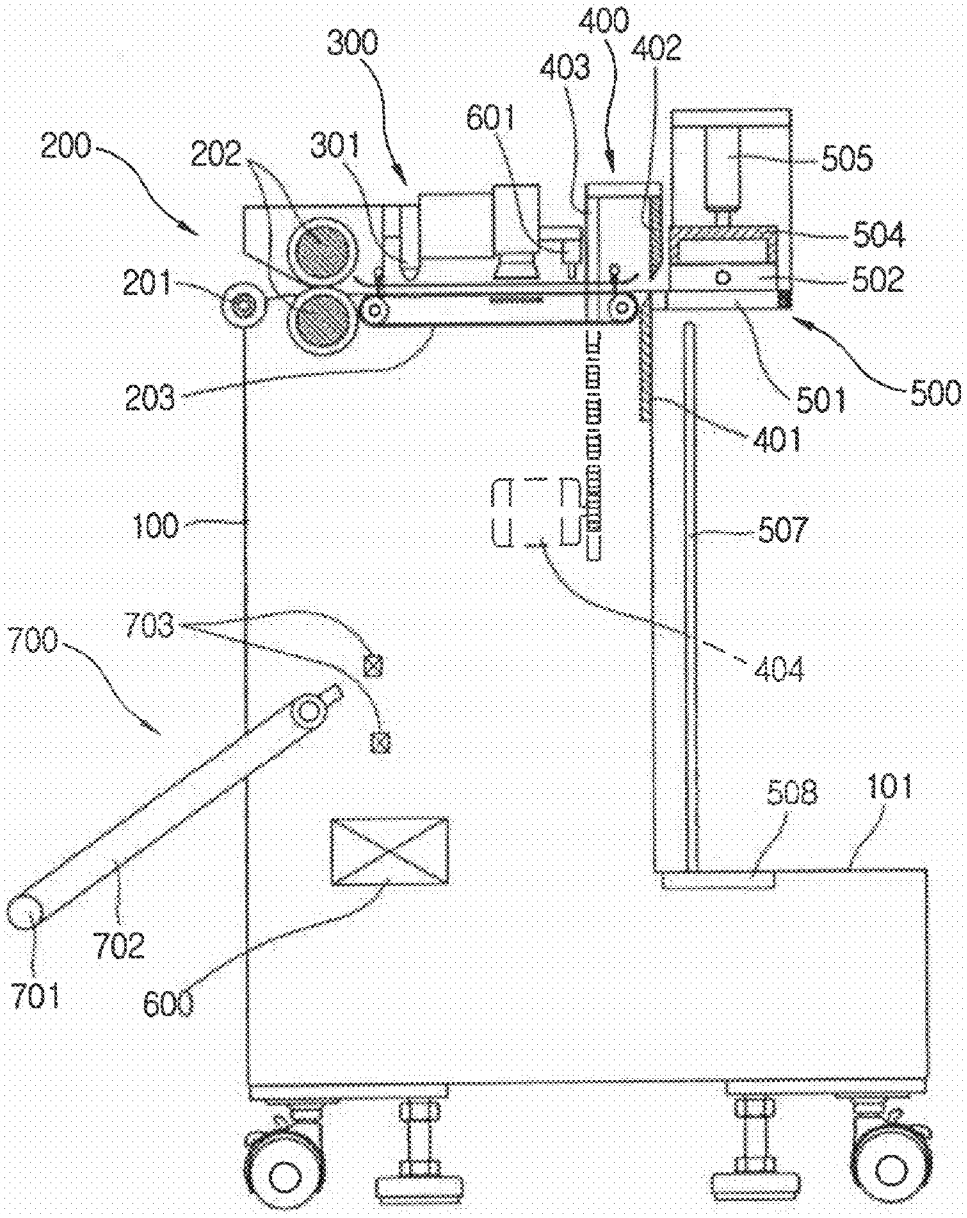
FIG. 12 is a schematic front sectional view illustrating an apparatus for cutting a series of medicine packets according to a sixth preferred embodiment of the present invention.
Figure 13:
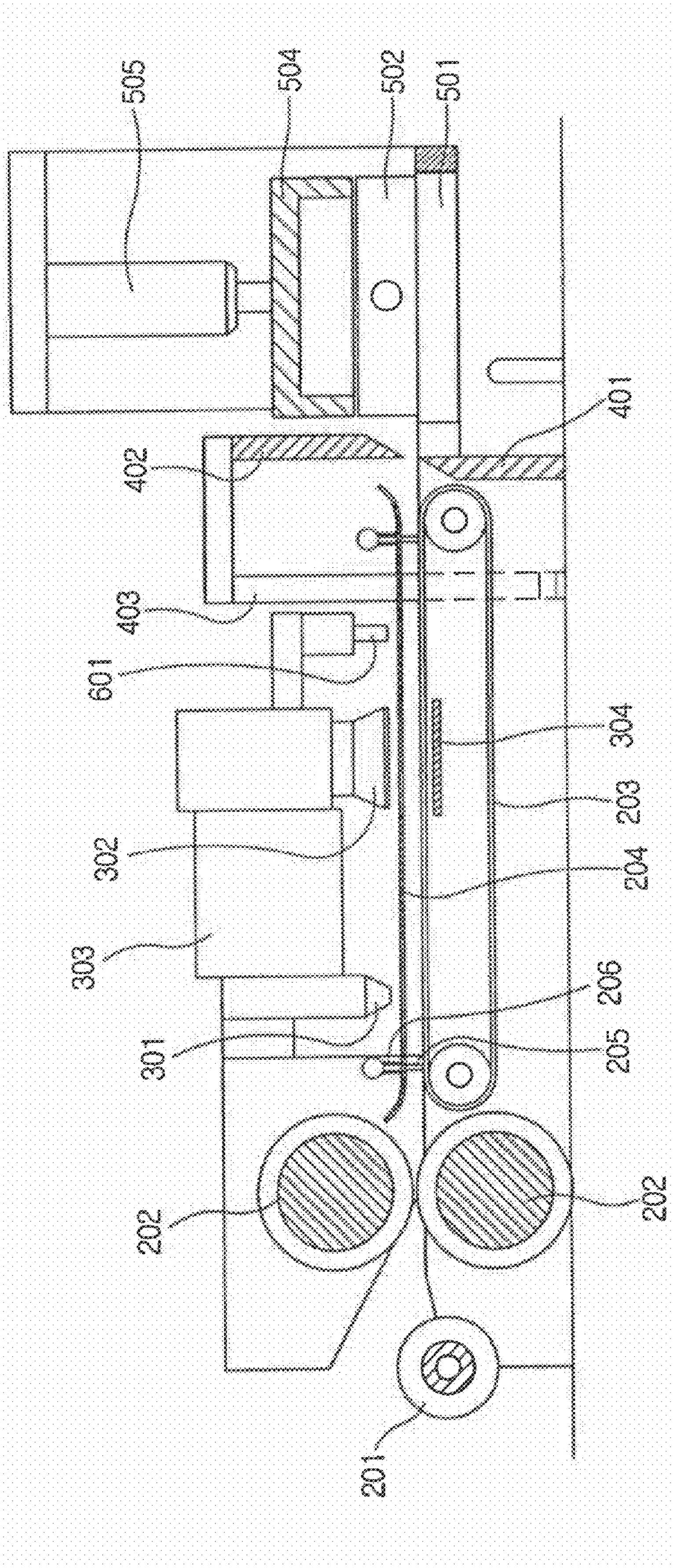
FIG. 13 is an enlarged view of the apparatus for cutting a series of medicine packets according to the sixth preferred embodiment of the present invention shown in FIG. 12.
Figure 14:
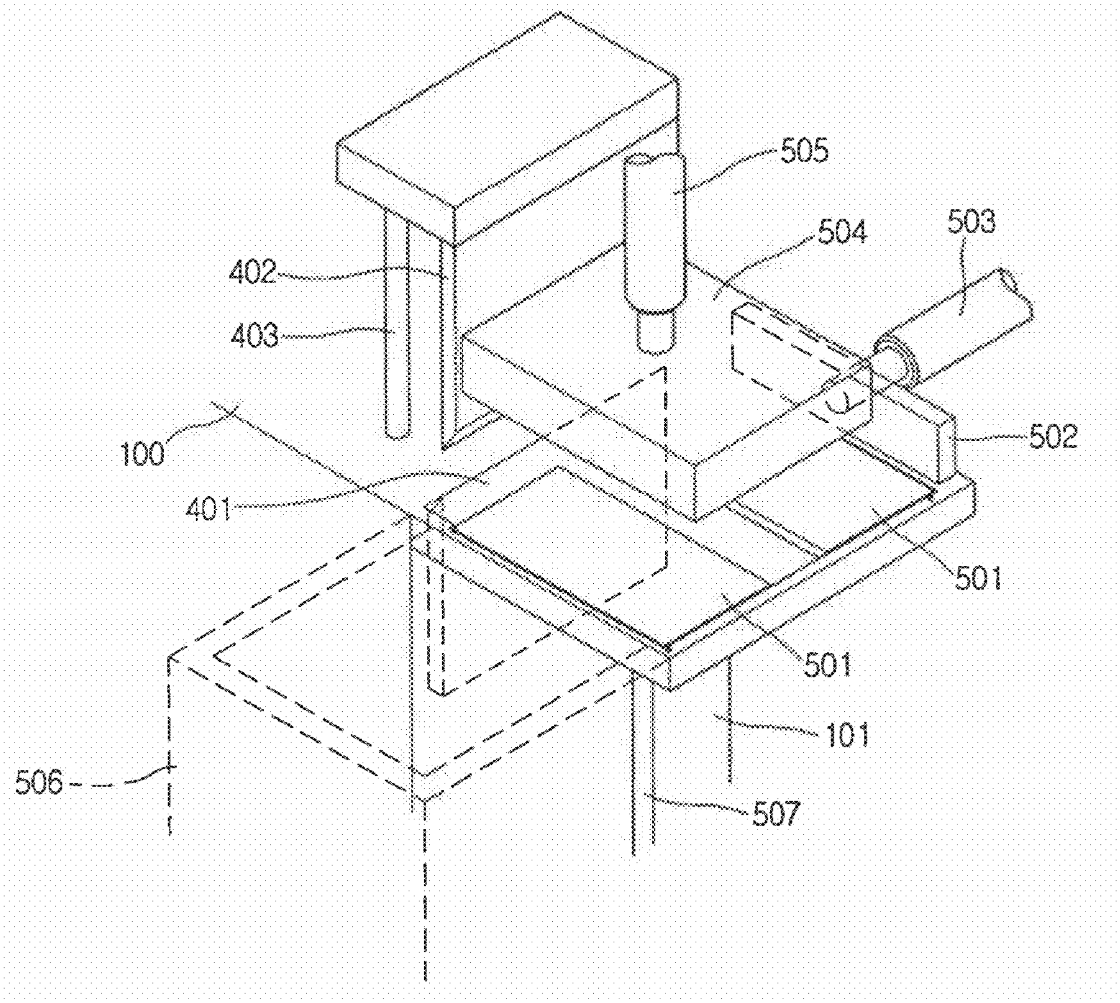
FIG. 14 is an enlarged perspective view illustrating main parts of the apparatus for cutting a series of medicine packets according to the sixth preferred embodiment of the present invention.

FIG. 12 is a schematic front sectional view illustrating an apparatus for cutting a series of medicine packets according to a sixth preferred embodiment of the present invention, FIG. 13 is an enlarged view of the apparatus for cutting a series of medicine packets according to the sixth preferred embodiment of the present invention shown in FIG. 12, and FIG. 14 is an enlarged perspective view illustrating main parts of the apparatus for cutting a series of medicine packets according to the sixth preferred embodiment of the present invention.

As shown in the drawings, the apparatus for cutting a series of medicine packets according to the sixth preferred embodiment of the present invention includes a feeding device 200 for feeding a series of medicine packets R from the upper side of a main body 100 to a stepped part 101 formed at the other side of the main body 100, an inspector 300 for inspecting a barcode of the medicine packets P fed by the feeding device 200 and tablets in the medicine packets P, a cutting device 400 for cutting the series of medicine packets R fed along the upper side of the main body 100 into individual medicine packets P at the stepped part 101, a rejecting and loading device 500 for rejecting or loading the cut medicine packets P based on the information received from the inspector 300, and a controller 600 for controlling the feeding device 200, the cutting device 400, and the rejecting and loading device 500.

The feeding device 200 includes a guide roller 201 disposed at the side of the main body 100, a pair of feeding rollers 202 driven by a motor and disposed at the upper side of the main body 100 to bite and feed the upper and lower sides of the medicine packets P guided by the guide roller 201 into the feeding device 200, a belt conveyor 203 for conveying the medicine packets P fed to the feeding device 200 by the feeding rollers 202, a plurality of fixing pins 205 for elastically pressing the upper sides of the medicine packets P conveyed by the belt conveyor 203, and a pressing plate 204 installed at the upper side of the main body 100 to be elastically moved upward and downward by springs 206 installed around the fixing pins 205.

After a series of medicine packets R, guided to the upper side of the main body 100 by the guide roller 201, is fed into the main body 100 by the feeding rollers 202, the feeding device 200 allows the fed medicine packets R to be precisely conveyed to the cutting device 400 by the belt conveyor 203 while being supported by the pressing plate 204.

The inspector 300 includes a barcode reader 301 installed to the upper side of the feeding device 200 to inspect whether the barcode printed on the upper side of the medicine packet P is detected or not, a camera 302 installed to the side of the barcode reader 301 above the feeding device 200 to capture images of tablets accommodated in the medicine packets P exposed by a backlight 304 installed in the feeding device 200, and an image reader 303 for determining whether the tablets are damaged or not using an image captured by the camera 302 and transmitting the result to the controller 600.

The inspector 300 inspects whether the barcode is correctly printed on the upper side of the medicine packet P and is readable by the barcode reader 301 or not, and illuminates the lower side of the medicine packet P using the backlight 304 to expose the tablet accommodated in the medicine packet P so that the camera 302 above the medicine packet captures an image of the tablet and the image reader 303 determines whether the tablet is damaged using the captured image or not.

Thus, when the barcode reader 300 cannot read the barcode printed on the medicine packet P due to misprinting of the barcode or reads that the tablet accommodated in the medicine packet P is damaged, the inspector 300 inputs the inspection result information to the controller 600 to inform the controller 600 the fact that the medicine packet P to be cut is deteriorated.

In addition, preferably, the belt conveyor 203 is made of a transparent material such that light emitted from the backlight 304 passes through the belt conveyor 203 and illuminates the lower side of the medicine packet P.

Moreover, the cutting device 400 includes a lower knife 401 installed at the upper end of the main body 100, an upper knife 402 corresponding to the lower knife 401 and installed above the lower knife 401, a guide rod 403, to the upper end of which the upper knife 402 is installed, disposed in the main body 100 to be slid upward and downward, and a vertical driving part 404 installed in the main body 100 to move the guide rod 403 upward and downward under the control of the controller 600.

When a cutting portion of the medicine packets R is positioned at the upper end of the lower knife 401, the cutting device 400 cuts the medicine packets P such that the vertical driving part 404 is driven by the controller 600 to move the guide rod 403 downward so that the upper knife 402, installed to the upper end of the guide rod 403, moves downward and passes through the lower knife 401 to cut a medicine packet P positioned at the end of the series of medicine packets R.

The vertical driving part 404 is preferably structured such that a rack, installed at the lower side of the guide rod 403 in the longitudinal direction to move the guide rod 403 in the longitudinal direction, is engaged with a pinion driven by the motor and is moved in the longitudinal direction due to the rotation of the pinion by the motor. However, the structure of the vertical driving part 404 is not restricted to the above structure and various techniques can be applied to the vertical driving part 404.

In addition, the rejecting and loading device 500 includes an elastically folded door 501 installed in the stepped part 101 near to the side of the lower knife 401 such that the stepped part 11 supports the medicine packets cut by the cutting device 400, a rejecting plate 502 for rejecting the cut medicine packet positioned on the door 501 and determined to be a defective medicine packet from a side to the other side of the stepped part 101, a rejecting plate driving part 503 for driving the rejecting plate 502 to reciprocally move in the horizontal direction, a pusher 504 is installed above the door 501 in the vertical direction to drop a normal medicine packet cut by the cutting device 400, and a pusher driving part 505 for driving the pusher 504 to reciprocally move in the vertical direction.

The rejecting and loading device 500 further includes an accumulating vessel 506 disposed at the side of the stepped part 101 to accumulate the defective medicine packet removed from the side by the rejecting plate 502, a loading pin 507 installed in the stepped part 11 and inserted into the holes formed in the medicine packets when the medicine packets are dropped by the pusher 504, and a lower plate 508 detachably coupled with the upper side of the stepped part 101 and detachably attached to the lower side of the loading pin 507.

The rejecting and loading device 500 rejects a medicine packet determined to be a defective medicine packet to the side and drops a normal medicine packet down to be accumulated in predetermined number.

The door 501 supports the cut medicine packets in a state capable of being discharged downward. The door 501 is pivoted and opened downward about a hinge by the pusher 504 moving downward, and restored to its initial state, i.e. a horizontal state by a torsion spring when the pusher 504 is lifted.

The rejecting plate 502 is horizontally disposed above the stepped part 101 and is reciprocally moved in the horizontal direction by the rejecting plate driving part 503 to reject the cut medicine packet determined to be a defective medicine packet and positioned on the door 501 into the accumulating vessel 506.

Preferably, the rejecting plate driving part 503 includes a hydraulic cylinder for reciprocally moving a rod in the horizontal direction, but the present invention is not restricted to this configuration.

The pusher 504 is installed above the stepped part 101 in the vertical direction and reciprocally moved in the vertical direction by the pusher driving part 505 so as to push the cut medicine packet, determined to be a normal medicine packet and positioned on the door 501, to the lower side of the door 501 so that the loading pin 507 is inserted into the hole of the normal medicine packet to load the normal medicine packets.

Preferably, the pusher driving part 505 includes a hydraulic cylinder for reciprocally moving a rod in the vertical direction, but the present invention is not restricted to this configuration.

The controller 600 precisely controls the feeding device 200, the cutting device 30, and the rejecting and loading device 500 based on the position information for the holes in the medicine packets inputted from the position sensor 601 installed at the upper side of the main body 100.

The position sensor 601 detects the positions of the holes formed in the medicine packets of a series of the medicine packets slid and conveyed along the lower side of the pressing plate 204 through a through-hole formed in the pressing plate 204.

The apparatus for cutting a series of medicine packets according to the sixth preferred embodiment of the present invention further includes a length detecting device 700 provided at the side of the main body 100 to detect a length of the series of medicine packets R discharged from the automatic medicine packaging machine and to input the detected length to the controller 600 such that the feed of the series of medicine packets R to the feeding device 200 is adjusted.

The length detecting device 700 includes a weight rod 701 for pressing the upper side of the series of medicine packets R positioned between the automatic medicine packaging machine and the feeding device 200 due to its weight, a link

702 hinged with an end of the weight rod 701 at an end and hinged with the main body 100 at the other end, and angle sensors 703 installed in the main body 100 to detect an angle of the link 702 and to input the detected angle to the controller 600.

The length detecting device 700 detects the length of the series of medicine packets R discharged from the automatic medicine packaging machine and inputs the detected length of the series of medicine packets R to the controller 600 so that the controller 600 can control the feeding device 200 and the cutting device 400 based on the detected length of the series of medicine packets R.

In other words, when the series of medicine packets R is discharged from the automatic medicine packaging machine 2 and its length is increased, the weight rod 701 is pivoted downward together with the link 702 due to the increased length of the series of medicine packets R so that the angle sensors 703 detect the pivoted angle of the link 702 and input the detected pivoted angle information to the controller 600. Thus, the controller 600 determines whether the length of the series of medicine packets R is increased or decreased.

Figure 15:
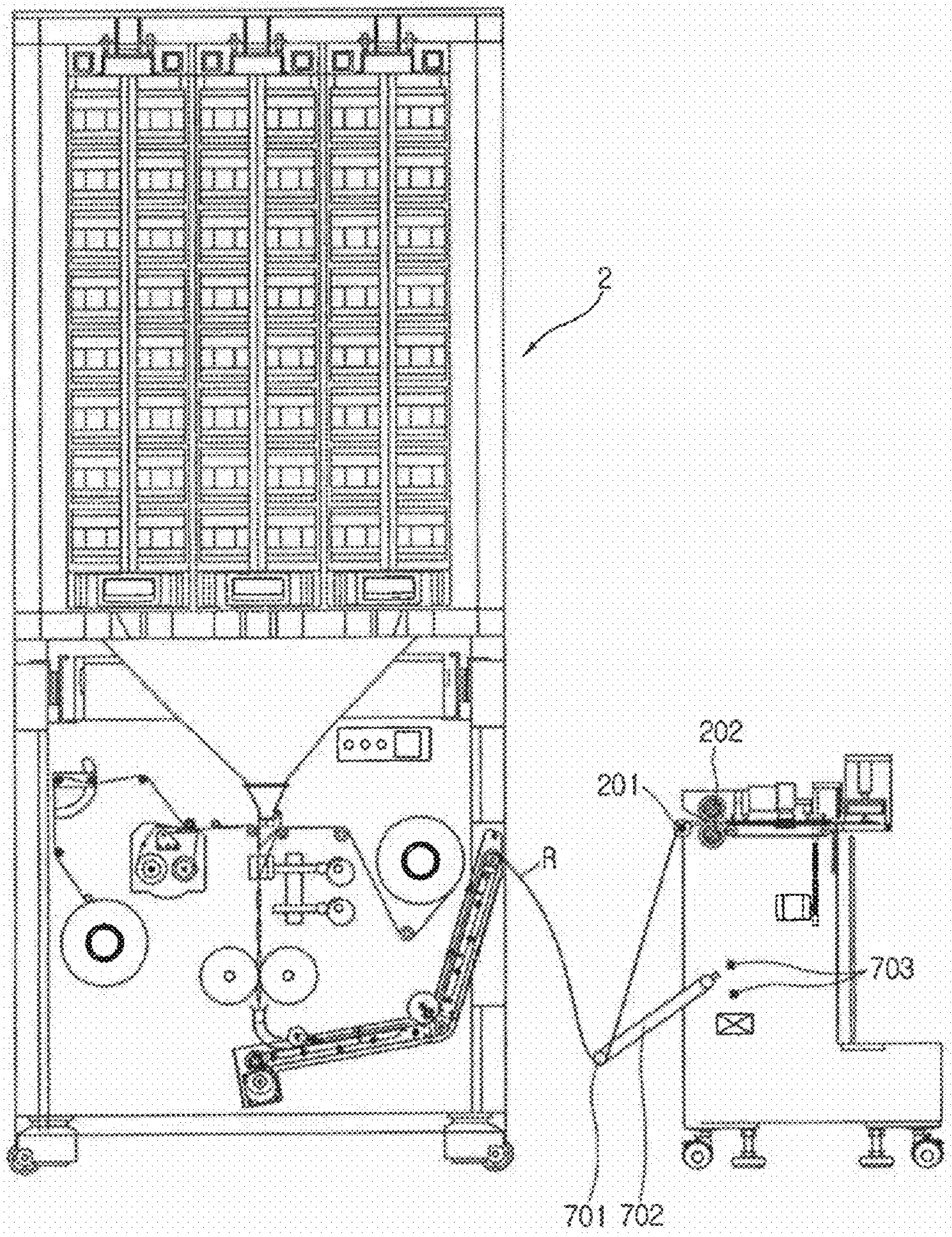
FIG. 15 is a front sectional view illustrating the operational state of the apparatus for cutting a series of medicine packets according to the sixth preferred embodiment of the present invention.
Figure 16:
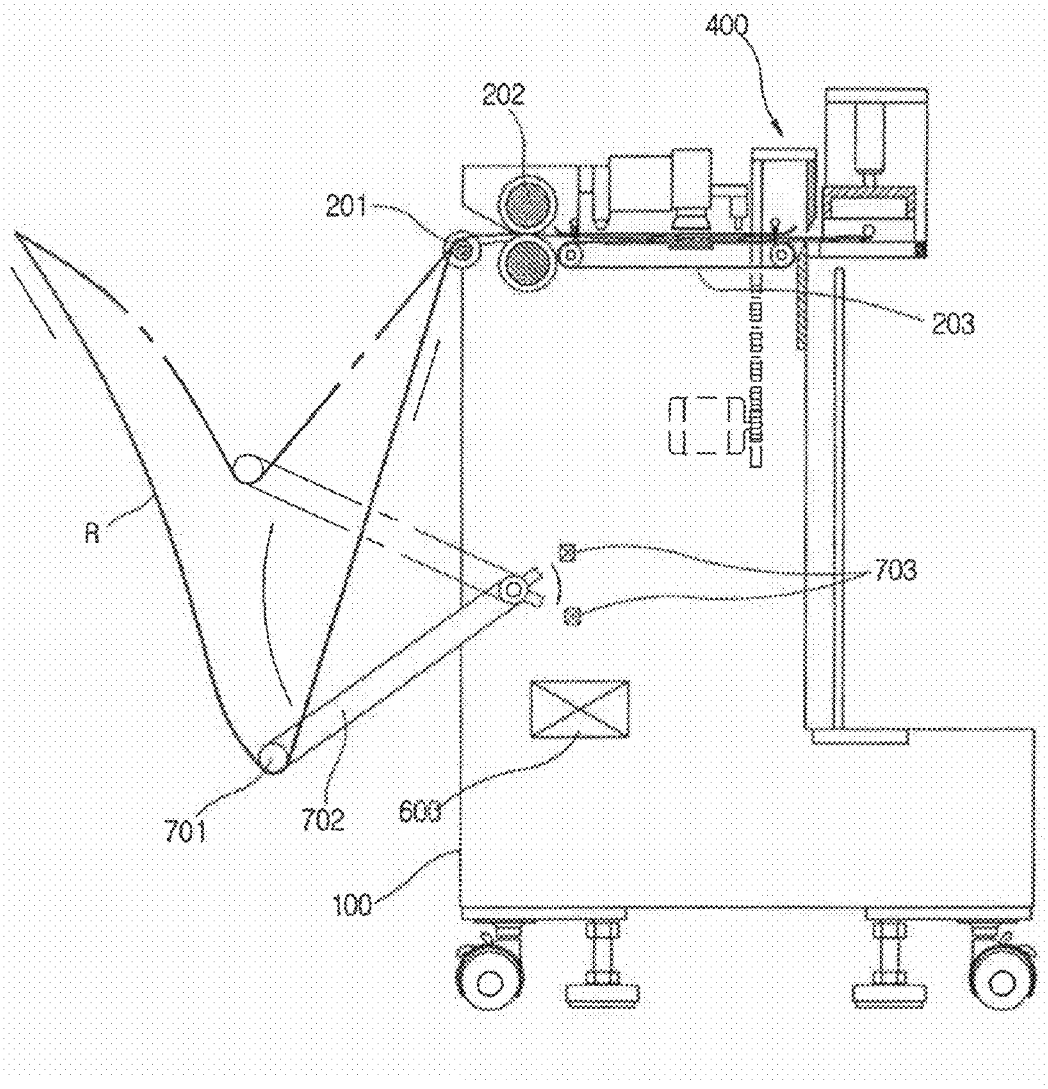
FIG. 16 is a front sectional view illustrating the operational state of a length detecting device of the apparatus for cutting a series of medicine packets according to the sixth preferred embodiment of the present invention.

FIG. 15 is a front sectional view illustrating the operational state of the apparatus for cutting a series of medicine packets according to the sixth preferred embodiment of the present invention, and FIG. 16 is a front sectional view illustrating the operational state of a length detecting device of the apparatus for cutting a series of medicine packets according to the sixth preferred embodiment of the present invention.

As shown in the drawings, the series of medicine packets R discharged to the side of the automatic medicine packaging machine is stored in a state that the lower side thereof contacts the guide roller 201 and the lower and upper sides are bitten by the feeding rollers 202.

In the state, when the series of medicine packets R is continuously discharged from the automatic medicine packaging machine 2, the length of the series of medicine packets R is increased and the weight rod 701, pressing the upper side of the series of medicine packets R, is pivoted downward together with the link 702 so that the angle sensors 703 detect the pivoted angle of the link 702 and input the detected pivoted angle information to the controller 600.

The controller 600 is informed of the fact that the length of the series of medicine packets R is increased from the angle sensors 703 and drives the feeding rollers 202, belt conveyor 203, and the cutting device 400 to cut the series of medicine packets R as according to the increased length.

As such, when the series of medicine packets R is fed into the main body 100 by the feeding rollers 202 and its length is decreased, the series of medicine packets R lifts the weight rod 701 thereby pivoting the link 702 upward. At that time, the angle sensors 703 detect the pivoted angle of the link 702 and input the detected pivoted angle of the link 702 to the controller 600 so that the controller 600 compares the inputted angle information with a predetermined limit with respect to the pivoted angle of the link 702. When the inputted angle information reaches the predetermined limit, the controller 600 stops the feeding rollers 202 to prevent the series of medicine packets R from excessively feeding.

Figure 17:
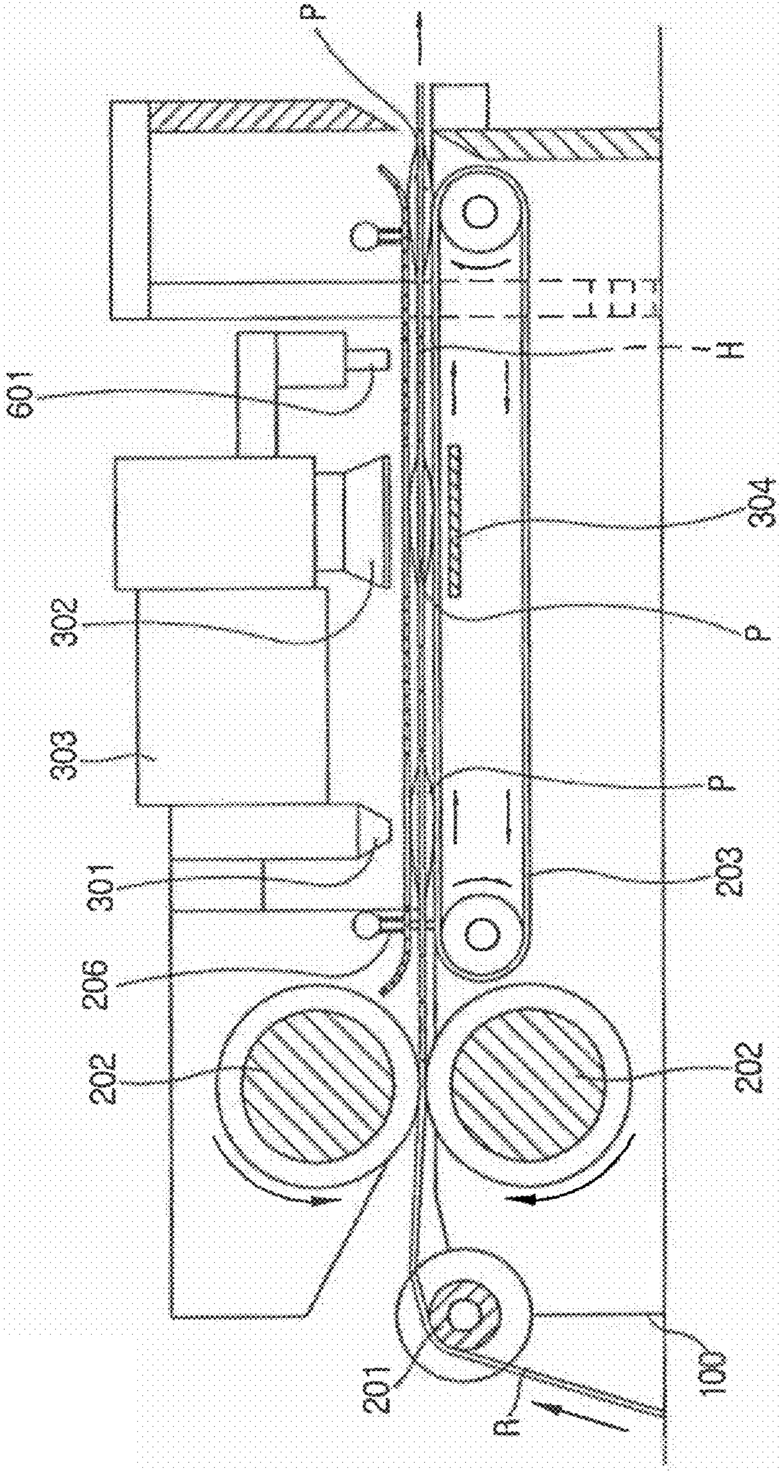
FIG. 17 is an enlarged front sectional view of main parts illustrating the operational state of a feeding device of the apparatus for cutting a series of medicine packets according to the sixth preferred embodiment of the present invention.

FIG. 17 is an enlarged front sectional view of main parts illustrating the operational state of a feeding device of the apparatus for cutting a series of medicine packets according to the sixth preferred embodiment of the present invention.

As shown in the drawing, the series of medicine packets R guided by the guide roller 201 is bitten at the lateral sides thereof by the feeding rollers 202 and is fed into the upper side of the main body 100.

The fed series of medicine packets R lifts the pressing plate 204 and is positioned on the belt conveyor 203 in a state of being elastically supported by the pressing plate 204 and the springs 206 provided thereto. The series of medicine packets R positioned on the belt conveyor 203 is conveyed along the upper side of the main body 100 by the belt conveyor 203.

At that time, the position sensor 601 installed to the upper side of the main body 100 detects the hole H of the medicine packet P conveyed between the lower side of the pressing plate 204 and the upper side of the belt conveyor 203 through the through-hole of the pressing plate 204, and inputs the position information to the controller 600.

The controller 600, having received the position information with respect to the hole H of the medicine packet P, stops the belt conveyor 203 so as to interrupt the feed of the series of medicine packets R and initiates the cutting of medicine packet P.

In other words, when the hole H of the medicine packet is detected by the position sensor 601, the controller 600 determines that the medicine packet P directly positioned before the medicine packet P of which the position of the hole H is detected, and stops the feed of the series of medicine packets R to immediately initiate the cutting of the medicine packet P.

Moreover, when the feed of the series of medicine packets R is stopped, the barcode reader 301 reads the barcode printed on the upper side of the medicine packet P through the through-hole formed in the pressing plate 204.

When the barcode reader 301 cannot read the barcode printed on the upper side of the medicine packet P, the controller 600 determines that the medicine packet P is a defective medicine packet.

As such, during the inspection of the barcode of the medicine packet P, the backlight 304 is turned on to illuminate the lower side of the medicine packet P and to expose the tablet accommodated in the medicine packet P so that the camera 302 captures an image of the upper side of the exposed tablet.

The image reader 303 reads and determines whether the tablet is damaged or not using the image shot by the camera 302. When the image reader 303 determined that the tablet accommodated in the medicine packet P is damaged, the controller 600 determines the medicine packet P accommodating the tablet to be a defective medicine packet P.

Figure 18:
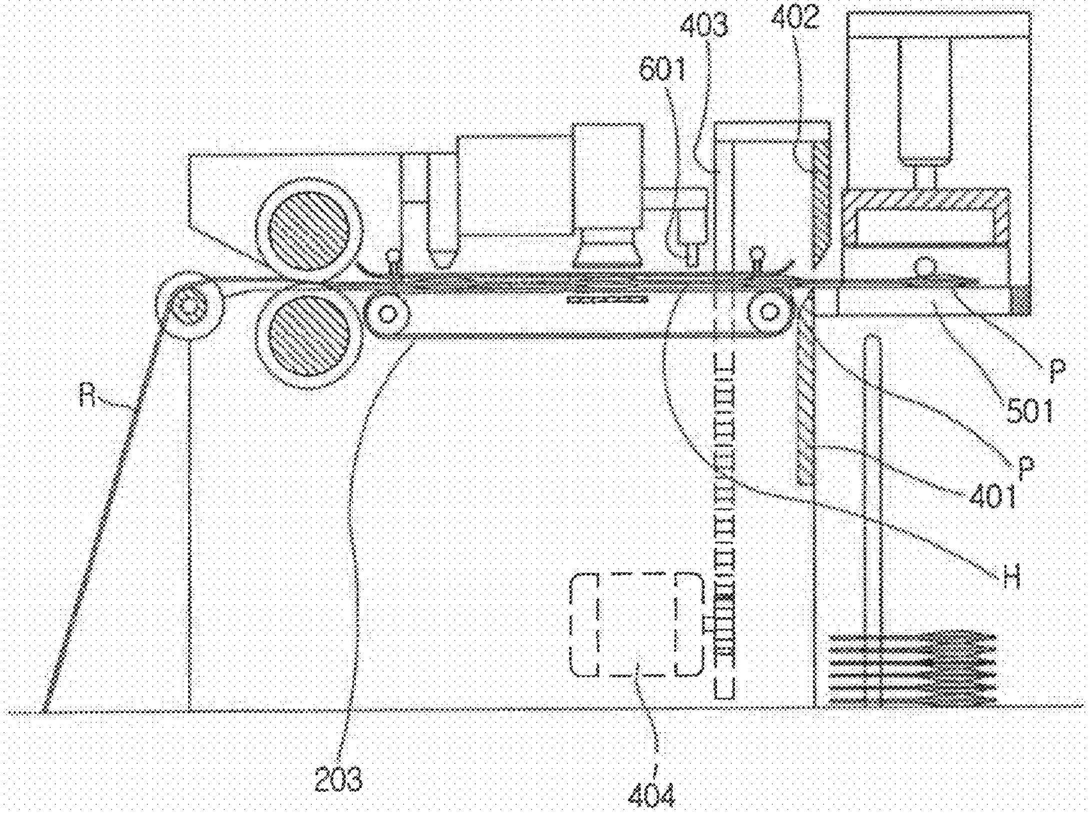
FIG. 18 is an enlarged front sectional view of main parts illustrating a state before cutting a medicine packet in the apparatus for cutting a series of medicine packets according to the sixth preferred embodiment of the present invention.
Figure 19:
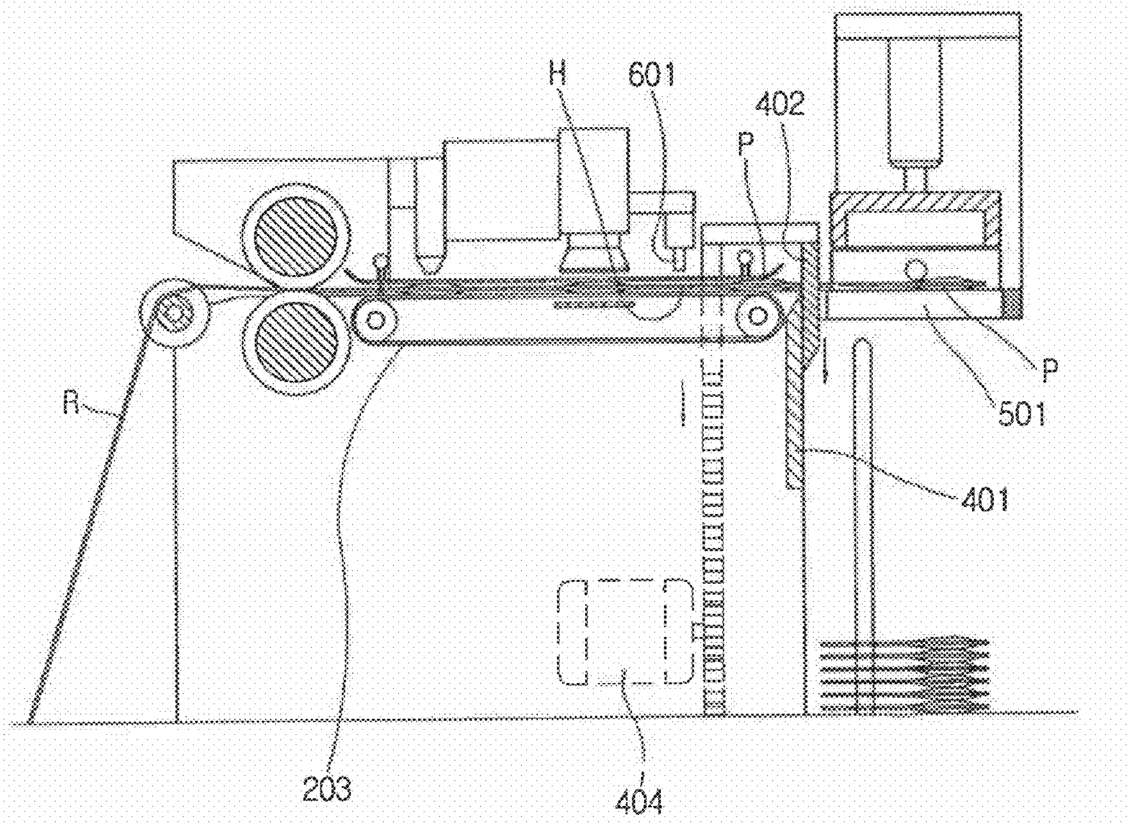
FIG. 19 is an enlarged front sectional view of main parts illustrating a state after cutting a medicine packet in the apparatus for cutting a series of medicine packets according to the sixth preferred embodiment of the present invention.

FIG. 18 is an enlarged front sectional view of main parts illustrating a state before cutting a medicine packet in the apparatus for cutting a series of medicine packets according to the sixth preferred embodiment of the present invention, and FIG. 19 is an enlarged front sectional view of main parts illustrating a state after cutting a medicine packet in the apparatus for cutting a series of medicine packets according to the sixth preferred embodiment of the present invention.

As shown in the drawings, when the position information concerning the hole H of the medicine packet P is inputted by the position sensor 601, the belt conveyor 203 is stopped and the feed of the series of medicine packets R is also stopped.

At that time, the medicine packet P directly before the medicine packet P of which the position is detected by the position sensor 601 passes through the belt conveyor 203 and is positioned on the door 501.

As such, when the belt conveyor 203 is stopped and the medicine packet P is positioned on the door 501, the controller 600 drives the vertical driving part 404 to move the guide rod 403 downward, so that the upper knife 402 coupled with the upper end of the guide rod 403 moves down to the lower knife 401.

The upper knife 402 passes through the lower knife 401 so that the cutting portion of the medicine packet P positioned on the door 501 is instantly cut and is separated from the series of medicine packets R.

Figure 20:
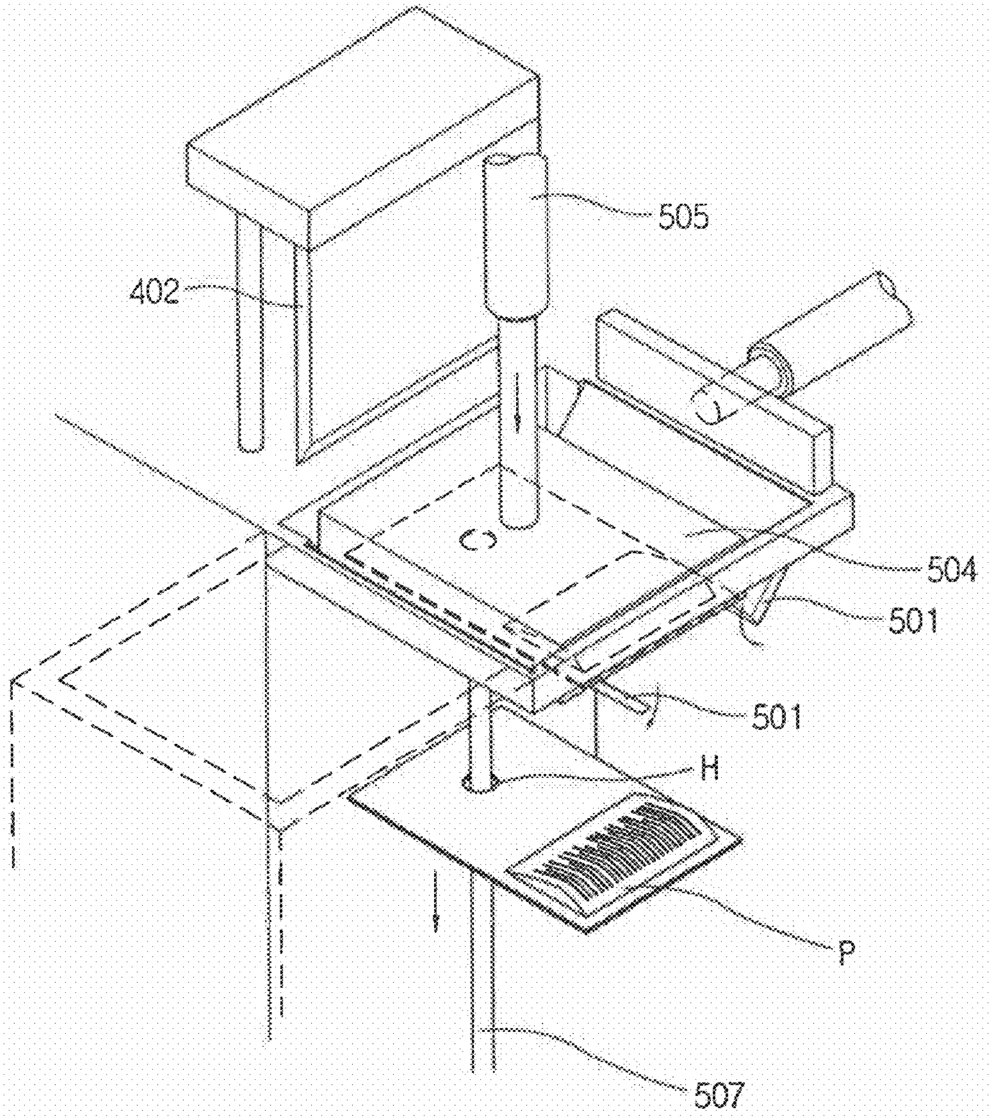
FIG. 20 is an enlarged perspective view of main parts illustrating a loading state of normal medicine packets in the apparatus for cutting a series of medicine packets according to the sixth preferred embodiment of the present invention.

FIG. 20 is an enlarged perspective view of main parts illustrating a loading state of normal medicine packets in the apparatus for cutting a series of medicine packets according to the sixth preferred embodiment of the present invention.

As shown in the drawing, the medicine packet P, determined to be a normal medicine packet because the barcode printed on the upper side thereof is correctly read and the tablet accommodated therein is not damaged, is cut by the downward movement of the upper knife 402 and is positioned on the door 501.

As such, the normal medicine packet P, positioned on the door 501, is dropped when the pusher driving part 505 is driven by the controller 600 to move the pusher 504 provided in the pusher driving part 505 so that the door 501 is downwardly pivoted to open.

When the medicine packet P is dropped by the pusher 504, the loading pin 507 is inserted into the hole H formed in the medicine packet P to load the medicine packets P.

Figure 21:
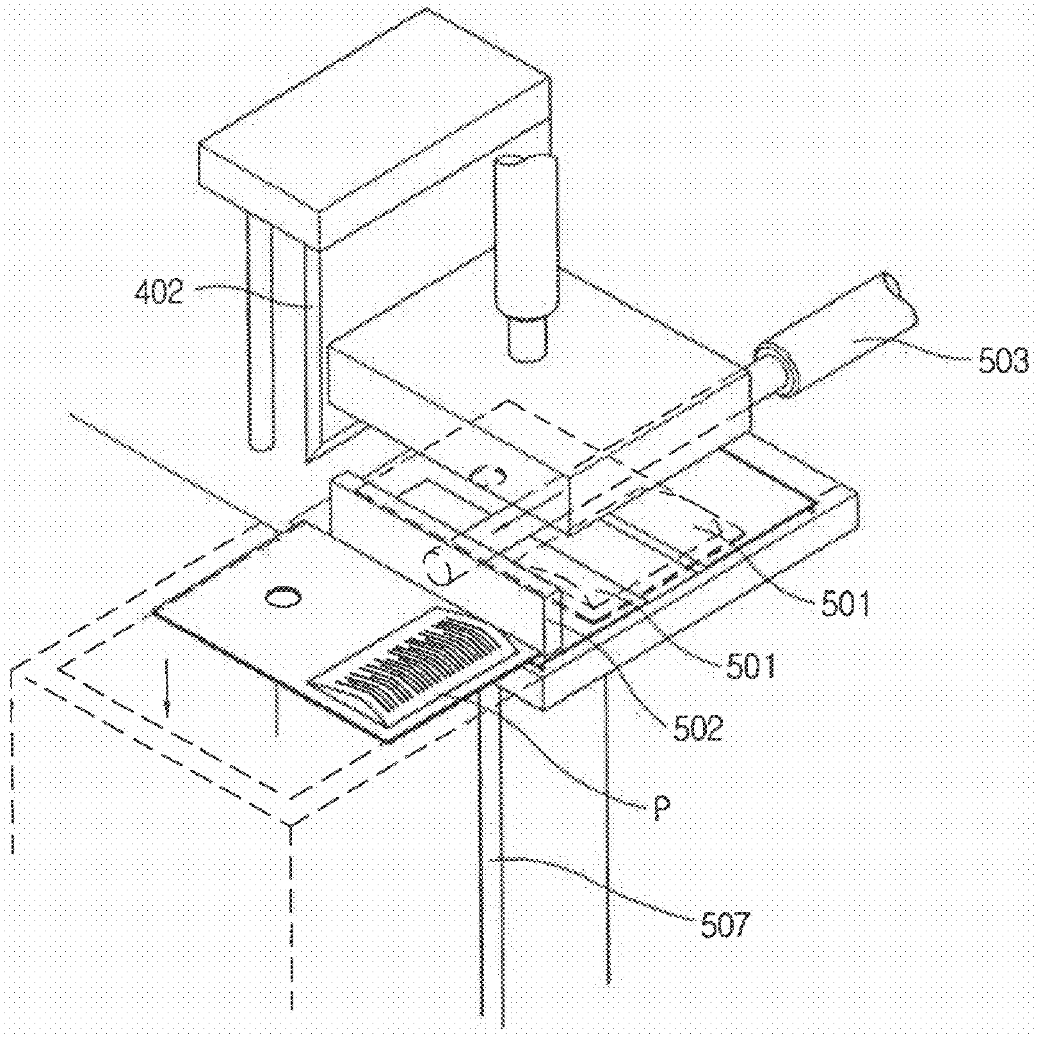
FIG. 21 is an enlarged perspective view of main parts illustrating a discharging state of defective medicine packets in the apparatus for cutting a series of medicine packets according to the sixth preferred embodiment of the present invention.

FIG. 21 is an enlarged perspective view of main parts illustrating a discharging state of defective medicine packets in the apparatus for cutting a series of medicine packets according to the sixth preferred embodiment of the present invention.

As shown in the drawing, the medicine packet P, determined to be a defective medicine packet P because the barcode printed on the upper side thereof cannot be read or the tablet accommodated therein is damaged, is cut by the downward movement of the upper knife 402 and is positioned on the door 501.

As such, the defective medicine packet P, positioned on the door 501, is horizontally moved by the rejecting plate 502 when the rejecting plate driving part 503 is driven by the controller 600 to horizontally move the rejecting plate 502 provided in the rejecting plate driving part 503, and is collected in the accumulating vessel 506.

Thus, the medicine packet P determined to be a defective medicine packet is moved from the upper side of the door 501 to the accumulating vessel 506, and is not hung on the loading pin 507, thereby being separated from the normal medicine packets.

Figure 22:
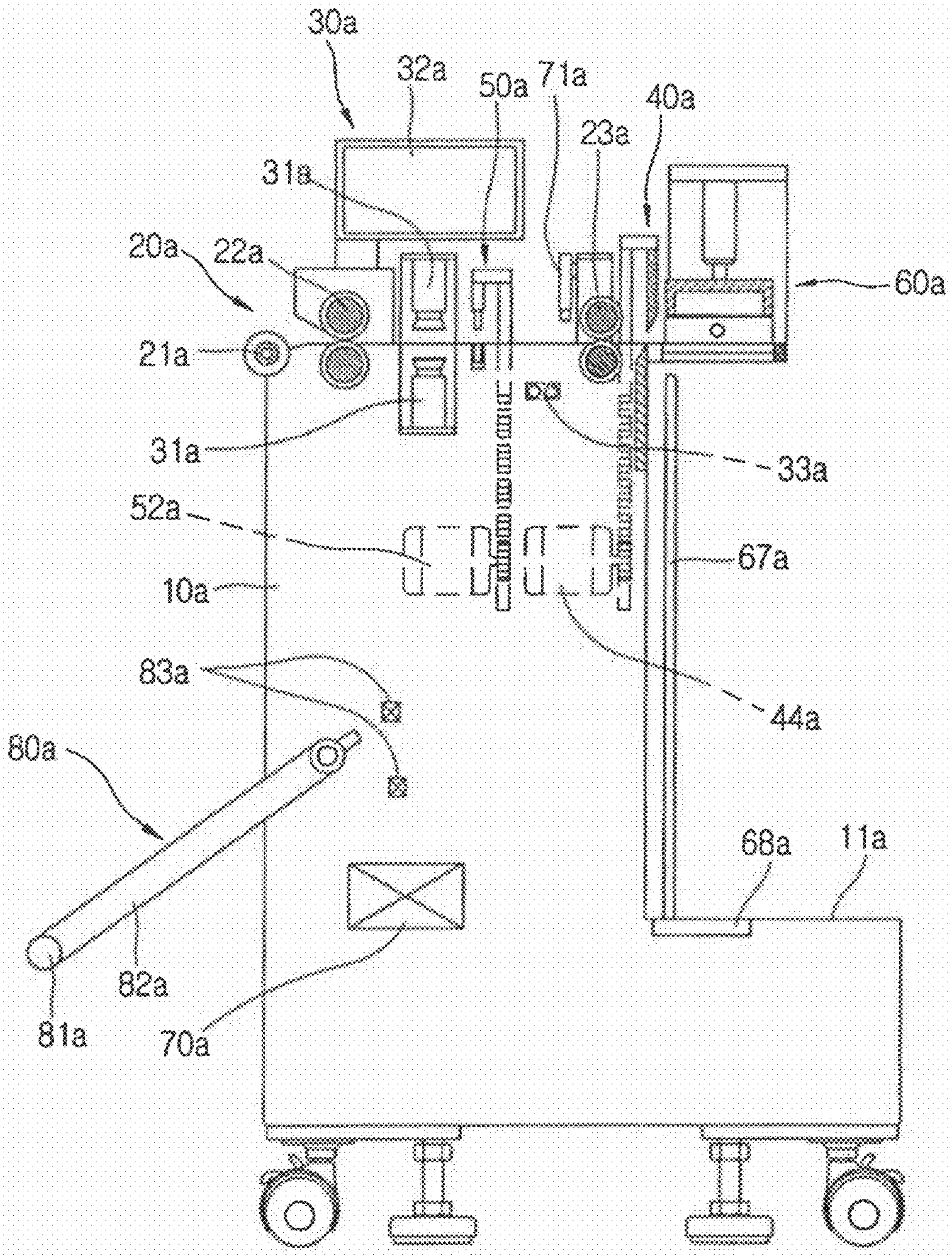
FIG. 22 is a schematic front sectional view illustrating an apparatus for cutting a series of medicine packets according to a seventh preferred embodiment of the present invention.
Figure 23:
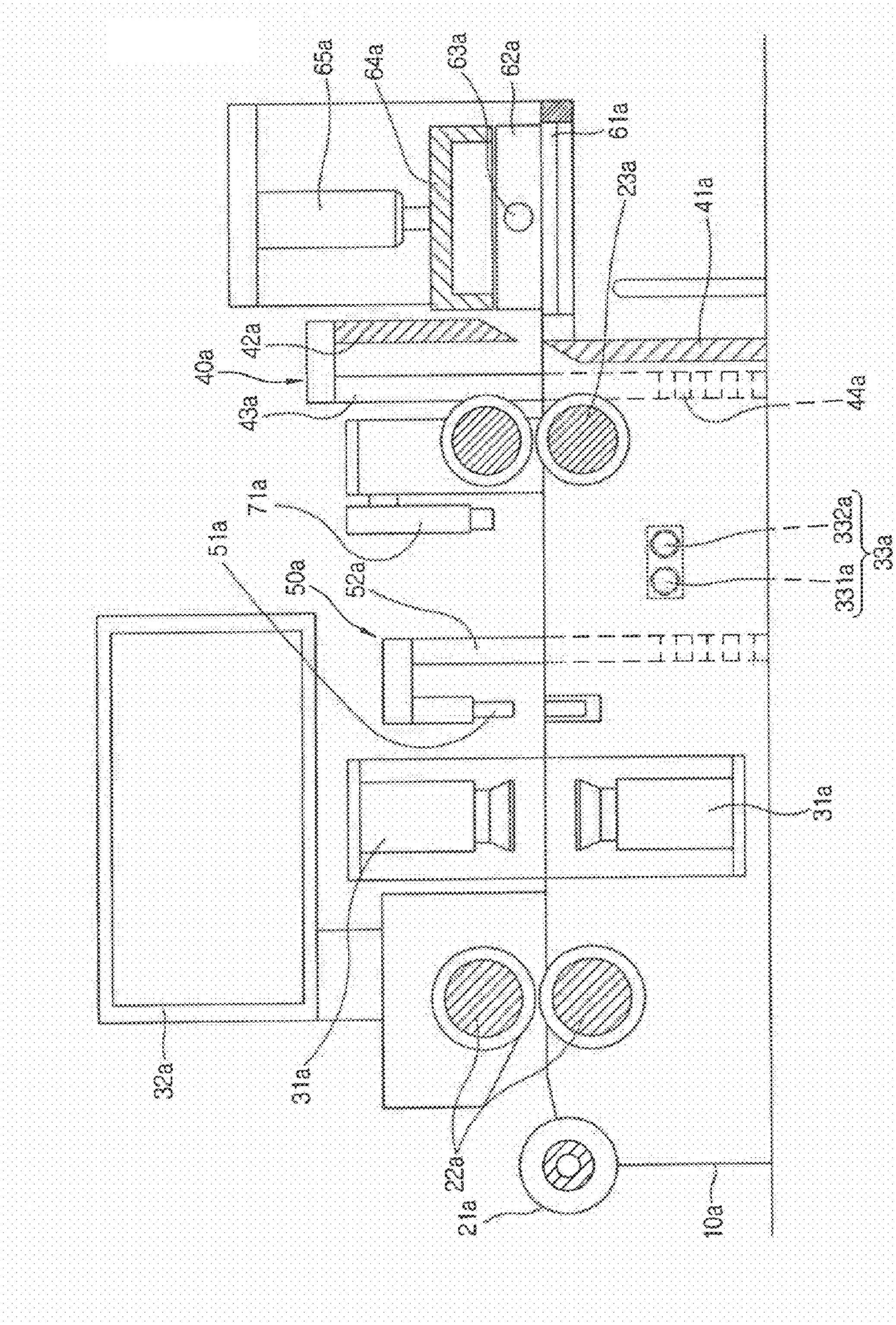
FIG. 23 is an enlarge view of main parts in FIG. 22.
Figure 24:
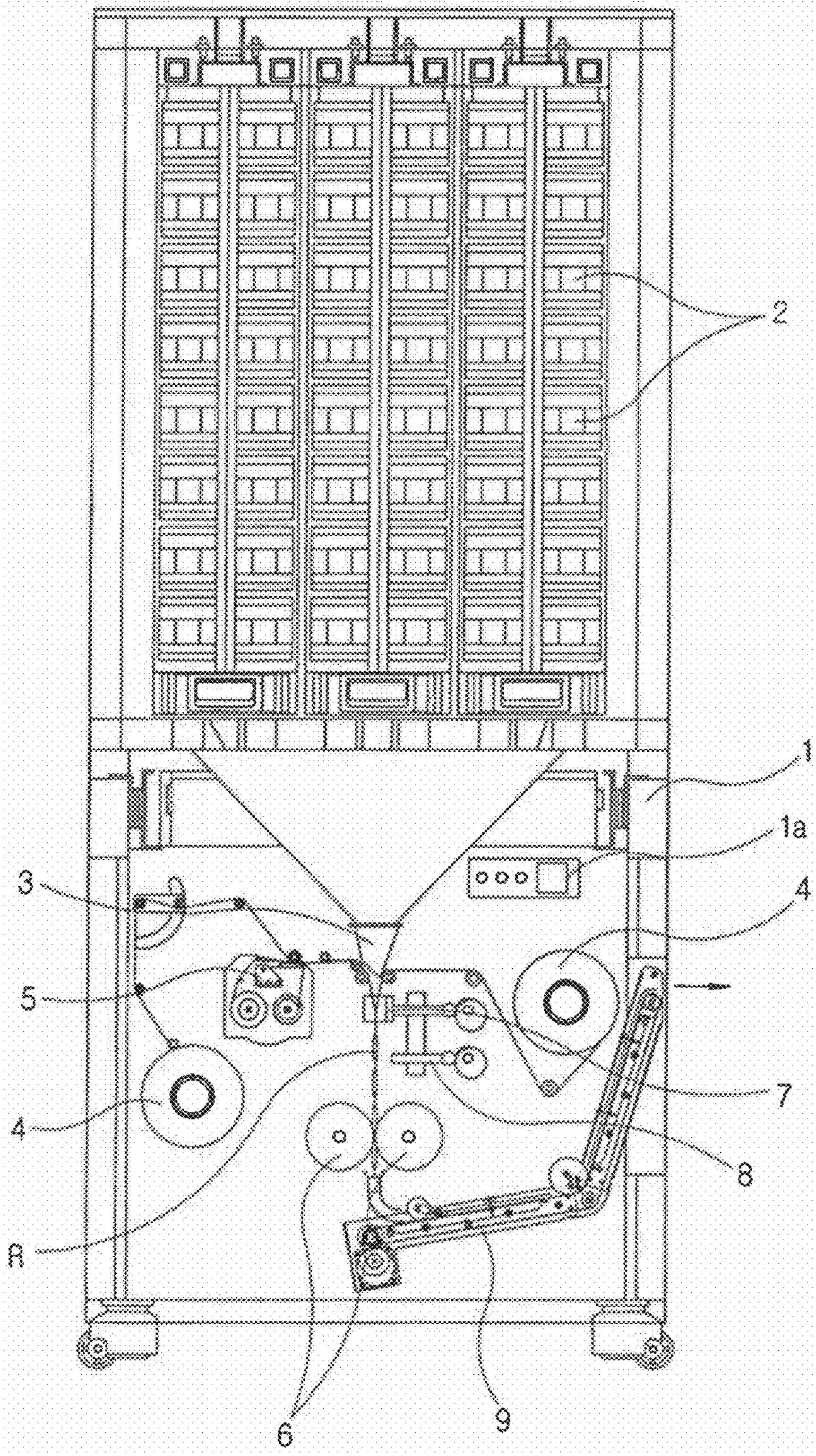
FIG. 24 is a front sectional view illustrating a conventional automatic medicine packaging machine.
Figure 25:
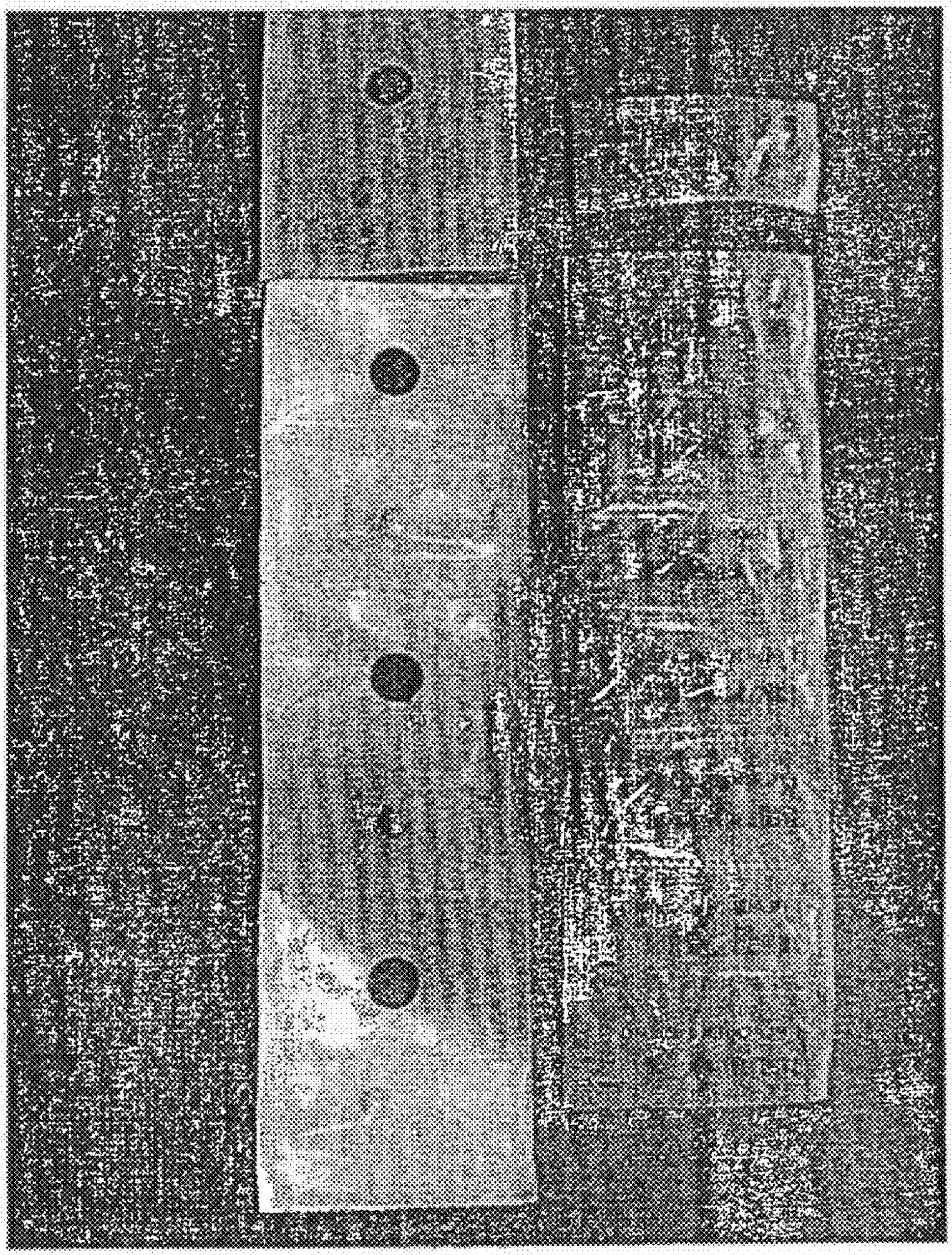
FIGS. 25 and 26 are photographs of the upper and lower sides of a series of medicine packets.
Figure 26:
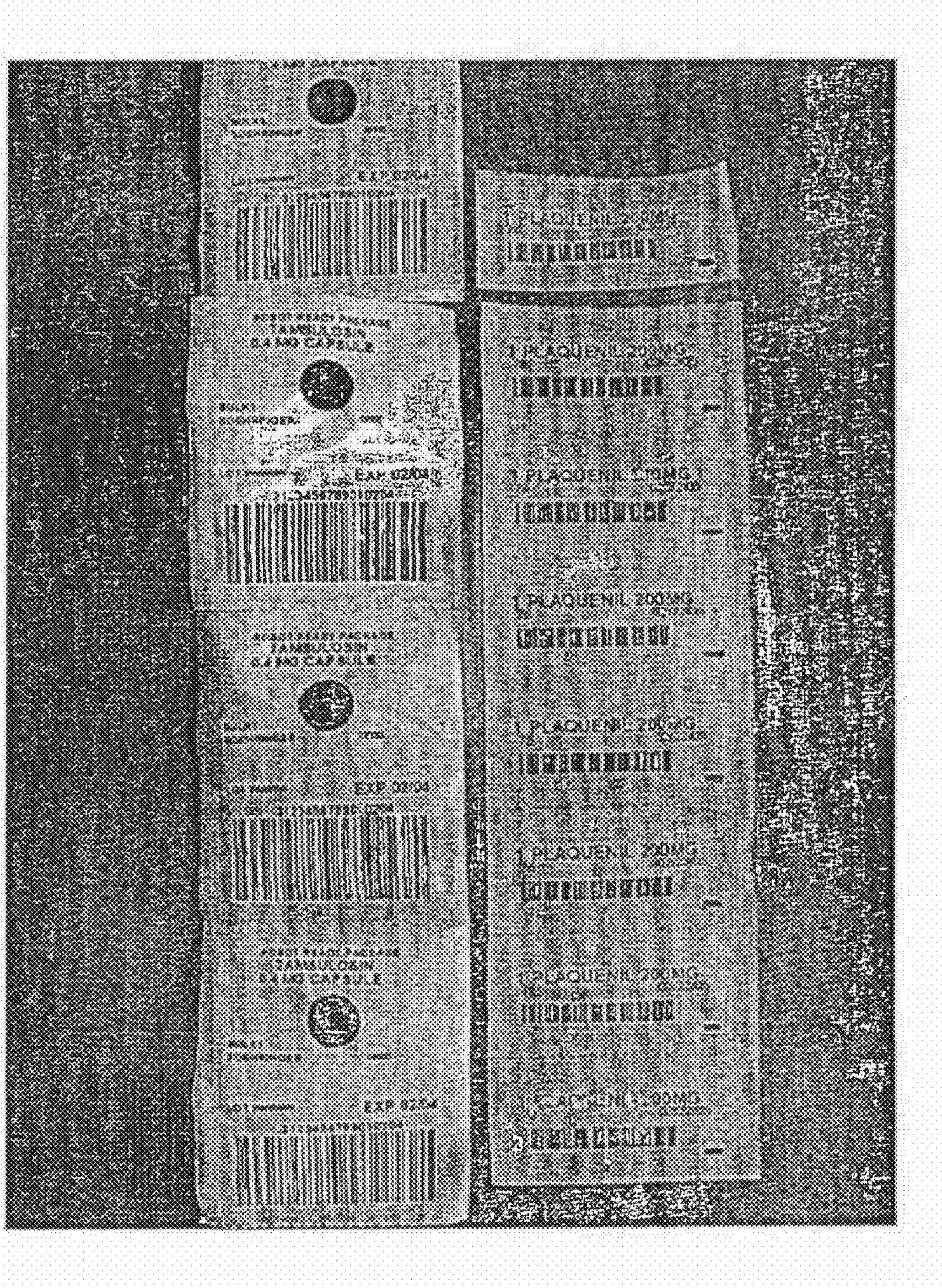

FIG. 22 is a schematic front sectional view illustrating an apparatus for cutting a series of medicine packets according to a seventh preferred embodiment of the present invention, and FIG. 23 is an enlarge view of main parts in FIG. 22.

As shown in the drawings, the apparatus for cutting a series of medicine packets according to the seventh preferred embodiment of the present invention includes a feeding device 20*a* for feeding a series of medicine packets from the upper side of a main body 10*a* to a stepped part 11*a* formed at the other side of the main body 10*a*, a visual inspector 30*a* for inspecting the barcodes and tablets fed by the feeding device 20*a* with the naked eye, a cutting device 40*a* for cutting the series of medicine packets into individual medicine packets at the stepped part 11*a*.

The feeding device 20*a* discharges the series of medicine packets such that a pair of feeding roller 22*a* disposed at the upper side of the main body 10*a* bites the series of medicine packets guided to the side of the main body 10*a* by a guide roller 21*a* to feed the series of medicine packets to the side of the main body 10*a* and a pair of discharging rollers 23*a* disposed at the other upper side of the main body 10*a* bites and feeds the series of medicine packets to the stepped part 11*a*.

In other words, in the feeding device 20*a*, the feeding rollers 22*a* and the discharging rollers 23*a* bite the series of medicine packets guided to the upper side of the main body 10*a* by the guide roller 21*a*, and then the bitten series of medicine packets is accurately fed to the stepped part 11*a* when the feeding roller 22*a* and the discharging rollers 23*a* are driven by a motor.

The visual inspector 30*a* captures images of the upper and lower sides of respective medicine packets fed by the feeding device 20*a* with a pair of cameras 31*a* and displays the images captured by the cameras 31*a* on a monitor 32*a* so that a worker can inspect condition of the medicine packets with the naked eye. The worker manipulates a button manipulation part 33*a* according to the result of the visual inspection to assign the respective medicine packets to a defective medicine packet or a normal medicine packet.

In other words, the worker determines whether the barcodes on the lower sides of the medicine packets are printed well or not using enlarged capture images of the lower sides of the medicine packets displayed on the monitor 32*a* and whether tablets accommodated in the medicine packets are damaged or not using enlarged capture images of the upper sides of the medicine packets displayed on the monitor 32*a*. As a result of the visual inspection, the worker presses a defective medicine packet assigning button 331*a* when a medicine packet is determined to a defective medicine packet, and presses a normal medicine packet assigning button 332*a*.

Thus, the visual inspector 30*a* allows the worker to determine the defective or normal state of the medicine packets with the naked eye and to assign the respective medicine packets to defective medicine packets or normal medicine packets.

The cutting device 40*a* cuts the medicine packets at the end of the series of medicine packets such that, when the cutting portions of the series of medicine packets are positioned at the upper end of a lower knife 41*a*, a vertical driving part 44*a* is driven to move a guide rod 43*a* downward so that an upper knife 42*a* installed to the upper end of the guide rod 43*a* moves down and passes through the lower knife 41*a*.

Preferably, the vertical driving part 44*a* is structured to move the guide rod 43*a* up and down such that a rack vertically installed to the lower end of the guide rod 43*a* is engaged with a pinion driven by a motor and moves due to the rotation of the pinion when the motor is driven. However, the vertical driving part 44*a* is not restricted to the above structure and various technologies may be applied to the vertical driving part 44*a*.

The apparatus for cutting a series of medicine packets further includes a defective medicine packet marker 50*a* for marking a medicine packet, assigned to a defective medicine packet by the visual inspector 30*a*, a mark indicating a defective medicine packet, a rejecting and loading device 60*a* for separating the defective medicine packets from the normal medicine packets and loading the normal medicine packets, and a controller 70*a* for controlling the feeding device 20*a*, the cutting device 40*a*, and the rejecting and loading device 60*a*.

The defective medicine packet marker 50*a* marks a medicine packet, determined to be a defective medicine packet, a mark indicating a defective medicine packet such that, when the worker determines the defective medicine packet through the monitor 32*a* and presses the defective medicine packet assigning button 331*a*, a punch driver 52*a* is driven to move a punch 51*a* to form a through-hole in the defective medicine packet. The punch driver 52*a* preferably includes a pinion rotated by a motor and a rack engaged with the pinion, but is not restricted to the structure.

In the rejecting and loading device 60*a*, when the medicine packet cut by the cutting device 40*a* and positioned on an elastically pivoting door 61*a* is determined to be a defective medicine packet, a rejecting plate driving part 63*a* is driven so that a rejecting plate 62*a* moves in the horizontal direction to push the defective medicine packet into an accumulating vessel (not shown).

In the rejecting and loading device 60*a*, when the medicine packet positioned on the door 61*a* is a normal medicine packet, a pusher driving part 65*a* drives a pusher 64*a* to press the upper side of the normal medicine packet, so that the normal medicine packet moves down and a loading pin 67*a* detachably disposed in the stepped part 11*a* by a lower plate 68*a* is inserted into the insert hole formed in the medicine packet so that the normal medicine packets are loaded.

The door 61*a* supports the cut medicine packets in a state capable of being discharged downward, and is structured such that a hinged portion is pushed by the pusher 64*a* and is pivoted down to open the lower side of the door 61*a* and when the pusher 64*a* is lifted, the door 61*a* is restored to the horizontal state, i.e. the original state, by a torsion spring.

Preferably, the rejecting plate driving part 63*a* and the pusher driving part 65*a* may be hydraulic cylinders for reciprocating a rod in the vertical and horizontal directions, but are not restricted to the structures.

The controller 70*a* controls a sensor 71*a* installed on the upper side of the main body 10*a* to detect the through-hole marked by the punch 51*a* to determine a feeding medicine packet to be a defective medicine packet and to detect the position of the insert hole and the cutting lines formed in the respective medicine packets.

Moreover, the controller 70*a* determines whether the medicine packets are defective or not and confirms the cutting lines using the information detected by the sensor 71*a* and controls the feeding device 20*a* and the cutting device 40*a* to accurately cut the medicine packets. The controller 70*a* also controls the rejecting and loading device 60*a* such the rejection of the defective medicine packets and the loading of the normal medicine packets are smoothly performed.

The controller 70*a* controls the cutting device 40*a* so that the cutting device 40*a* cuts the medicine packets one by one or a bundle of the medicine packets consisting of several medicine packets.

Moreover, the apparatus for cutting a series of medicine packets further includes a length detecting device 80*a* provided at the side of the main body 10*a* to detect a length of the series of medicine packets discharged from the automatic medicine packaging machine and to input the detected length to the controller 70*a* such that the feed of the series of medicine packets to the feeding device 20*a* is adjusted.

In the length detecting device 80*a*, when a weight rod 81*a* presses the upper side of the series of medicine packets positioned between the automatic medicine packaging machine and the feeding device 20*a* due to its weight, the weight rod 81*a* is pivoted to an angle corresponding to the length of the series of medicine packets and a link 82*a* connected to the weight rod 81*a* is rotated, and then angle sensors 83*a* detect a rotation angle of the link 82*a* and input the detected rotation angle to the controller 70*a*.

Thus, the controller 70*a* recognizes the length of the series of medicine packets discharged from the automatic medicine packaging machine and controls the feeding device 20*a* using the recognized information to keep the length of the series of medicine packets constant. As described above, according to the apparatus for cutting a series of medicine packets of the present invention, a series of medicine packets, discharged from an automatic medicine packaging machine, is cut into individual medicine packets and the cut medicine packets are loaded to a loading device, so that the cutting and loading of the series of medicine packets is easily performed and management and storage of the cut medicine packets are convenient.

Moreover, according to the apparatus for cutting a series of medicine packets of the present invention, a series of medicine packets is smoothly fed into the feeding device so that it is convenient to use and the series of medicine packets inspected with the naked eye is easily and continuously cut.

In addition, since the series of medicine packets are precisely fed and conveyed by a simple structure, the apparatus for cutting a series of medicine packets is easily manufactured and installed and the cutting of the series of medicine packet is precisely performed.

Since medicine packets in a series of medicine packets are cut and pressed down, the cut medicine packets are precisely and correctly loaded.

Since plural bundles consisting of a predetermined number of medicine packets are loaded, it is convenient to use and a plenty of medicine packets are easily loaded.

The cutting of a series of medicine packets is conveniently adjusted according to the length of a series of medicine packets discharged from an automatic medicine packaging machine so that the series of medicine packets is stably cut according to the distance of the series of medicine packets discharged from the automatic medicine packaging machine packager.

Moreover, since a series of medicine packets discharged from an automatic medicine packaging machine is cut into individual medicine packets to automatically load on a loading device, and it is convenient to inspect whether a tablet in the medicine packet is damaged and a barcode is properly printed in the upper side of the medicine packet or not, the series of medicine packets is easily cut and loaded, the management and storage of the cut medicine packets are convenient, and the defective medicine packets are easily rejected.

In addition, since it is convenient to inspect whether a barcode is properly printed in the upper side of the medicine packet and a tablet in the medicine packet is damaged or not by a simple structure, the defective medicine packets are easily rejected and convenience is enhanced.

Since defective medicine packets are easily collected while normal medicine packets are easily loaded in predetermined number, the management and storage of the defective medicine packets and the normal medicine packets are convenient.

Since the visual inspection of a series of medicine packets, discharged from the automatic medicine packaging machine, is easily performed, the series of medicine packets is easily cut and loaded so that management and storage of the cut medicine packets are convenient and the separation of the defective medicine packets is easily performed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for cutting a series of medicine packets comprising:

a feeding device for feeding the series of medicine packets, in which the medicine packets having holes are continuously connected to each other, from an upper side of a main body to a stepped part formed at the other side of the main body;

a cutting device for cutting the series of medicine packets fed along the upper side of the main body by one medicine packet at the stepped part;

a loading device for loading the medicine packets, cut by the cutting device and dropped to the stepped part, in predetermined number;

a controller including a position sensor for detecting a position of the hole formed in the medicine packet fed along the upper side of the main body and controlling the feeding device and the cutting device based on the position information of the hole of the medicine packets inputted from the position sensor; and a length detecting device provided at the side of the main body to detect a length of the series of medicine packets discharged from an automatic medicine packaging machine and to input the detected length to the controller such that the feed of the series of medicine packets to the feeding device is adjusted, the length detecting device comprising a weight rod for pressing the upper side of the series of medicine packets positioned between the automatic medicine packaging machine and the feeding device due to its weight;

a link hinged with an end of the weight rod at an end and hinged with the main body at the other end;

an angle sensor installed in the main body to detect an angle of the link and to input the detected angle to the controller; and a guide roller provided to a leading end of the main body to guide the series of medicine packets to the feeding device.

* * * * *